(12) United States Patent
Park

(10) Patent No.: US 9,135,275 B2
(45) Date of Patent: Sep. 15, 2015

(54) DIGITAL PHOTOGRAPHING APPARATUS AND METHOD OF PROVIDING IMAGE CAPTURED BY USING THE APPARATUS

(75) Inventor: Wan-je Park, Seongnam-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 776 days.

(21) Appl. No.: 13/271,384

(22) Filed: Oct. 12, 2011

(65) Prior Publication Data

US 2012/0188413 A1     Jul. 26, 2012

(30) Foreign Application Priority Data

Jan. 24, 2011 (KR) .................. 10-2011-0006956

(51) Int. Cl.
*H04N 5/262* (2006.01)
*G06F 17/30* (2006.01)
*H04N 1/00* (2006.01)
*H04N 9/74* (2006.01)
*G06K 9/32* (2006.01)
*H04N 101/00* (2006.01)

(52) U.S. Cl.
CPC ........ *G06F 17/30274* (2013.01); *H04N 1/0044* (2013.01); *H04N 1/00323* (2013.01); *H04N 2101/00* (2013.01); *H04N 2201/0084* (2013.01)

(58) Field of Classification Search
CPC . G09G 5/14; G06F 17/30274; H04N 1/00323
USPC ............ 348/239, 48, 578–601; 382/284–301; 386/280
See application file for complete search history.

(56) References Cited

U.S. PATENT DOCUMENTS

| | | | |
|---|---|---|---|
| 2007/0172112 A1* | 7/2007 | Paley et al. ................... | 382/154 |
| 2009/0027505 A1* | 1/2009 | Jung et al. ................... | 348/207.1 |
| 2009/0284585 A1* | 11/2009 | Tsai et al. ....................... | 348/48 |

* cited by examiner

*Primary Examiner* — Christopher K Peterson
(74) *Attorney, Agent, or Firm* — Drinker Biddle & Reath LLP

(57) ABSTRACT

A method of providing an image captured by using a digital photographing apparatus includes: displaying a first image from among a plurality of images stored in the digital photographing apparatus; obtaining a second image captured within a predetermined distance in a first direction from where the first image was captured, from the plurality of images by using position information about each of the first image and the second image; providing a user interface corresponding to the first direction; and displaying the second image in response to a user's input for selection of the user interface corresponding to the first direction.

22 Claims, 16 Drawing Sheets

FIG. 3A

| | Pic1.jpg(100m) | FIRST IMAGE | VALUE | SECOND IMAGE | VALUE | THIRD IMAGE | VALUE | FOURTH IMAGE | VALUE | FIFTH IMAGE | VALUE |
|---|---|---|---|---|---|---|---|---|---|---|---|
| 302— | UPWARD | ./pic2.jpg | 5m | ./pic3.jpg | 15m | ./pic4.jpg | 10m | | | | |
| 304— | DOWNWARD | ./pic11.jpg | 50m | ./pic12.jpg | 40m | ./pic13.jpg | 30m | ./pic14.jpg | 20m | ./pic15.jpg | 60m |
| 306— | LEFT | ./pic21.jpg | 10m | ./pic22.jpg | 20m | ./pic23.jpg | 30m | ./pic24.jpg | 40m | | |
| 308— | RIGHT | ./pic31.jpg | 40m | ./pic32.jpg | 35m | ./pic33.jpg | 55m | ./pic34.jpg | 25m | ./pic35.jpg | 15m |
| 310— | HEIGHT (UPWARD) | ./pic41.jpg | 5° | ./pic42.jpg | 15° | ./pic43.jpg | 25° | ./pic44.jpg | 10° | ./pic45.jpg | 30° |
| 312— | HEIGHT (DOWNWARD) | ./pic51.jpg | 30° | ./pic52.jpg | 20° | ./pic53.jpg | 10° | | | | |
| 314— | AZIMUTH (LEFT) | ./pic61.jpg | 50° | ./pic62.jpg | 40° | ./pic63.jpg | 30° | ./pic64.jpg | 20° | ./pic65.jpg | 10° |
| 316— | AZIMUTH (RIGHT) | ./pic71.jpg | 50° | ./pic72.jpg | 30° | | | | | | |
| 318— | ZOOM MAGNIFICATION (HIGH) | ./pic81.jpg | X4 | ./pic82.jpg | X3 | | | | | | |
| 320— | ZOOM MAGNIFICATION (LOW) | ./pic91.jpg | X1 | | | | | | | | |

FIG. 3B

| | Pic1.jpg(100m) | FIRST IMAGE | VALUE | SECOND IMAGE | VALUE | THIRD IMAGE | VALUE | FOURTH IMAGE | VALUE | FIFTH IMAGE | VALUE |
|---|---|---|---|---|---|---|---|---|---|---|---|
| 322— | UPWARD | ./pic2.jpg | 5m | ./pic4.jpg | 10m | ./pic3.jpg | 15m | | | | |
| 324— | DOWNWARD | ./pic14.jpg | 20m | ./pic13.jpg | 30m | ./pic12.jpg | 40m | ./pic11.jpg | 50m | ./pic15.jpg | 60m |
| 326— | LEFT | ./pic21.jpg | 10m | ./pic22.jpg | 20m | ./pic23.jpg | 30m | ./pic24.jpg | 40m | | |
| 328— | RIGHT | ./pic35.jpg | 15m | ./pic34.jpg | 25m | ./pic32.jpg | 35m | ./pic31.jpg | 40m | ./pic33.jpg | 55m |
| 330— | HEIGHT (UPWARD) | ./pic41.jpg | 5° | ./pic44.jpg | 10° | ./pic42.jpg | 15° | ./pic43.jpg | 25° | ./pic45.jpg | 30° |
| 332— | HEIGHT (DOWNWARD) | ./pic53.jpg | 10° | ./pic52.jpg | 20° | ./pic51.jpg | 30° | | | | |
| 334— | AZIMUTH (LEFT) | ./pic65.jpg | 10° | ./pic64.jpg | 20° | ./pic63.jpg | 30° | ./pic62.jpg | 40° | ./pic61.jpg | 50° |
| 336— | AZIMUTH (RIGHT) | ./pic72.jpg | 30° | ./pic71.jpg | 50° | | | | | | |
| 338— | ZOOM MAGNIFICATION (HIGH) | ./pic82.jpg | X3 | ./pic81.jpg | X4 | | | | | | |
| 340— | ZOOM MAGNIFICATION (LOW) | ./pic91.jpg | X1 | | | | | | | | |

FIG. 9
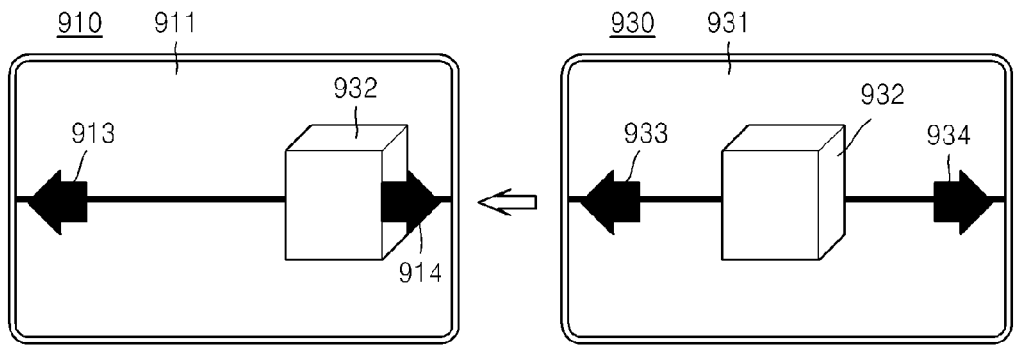
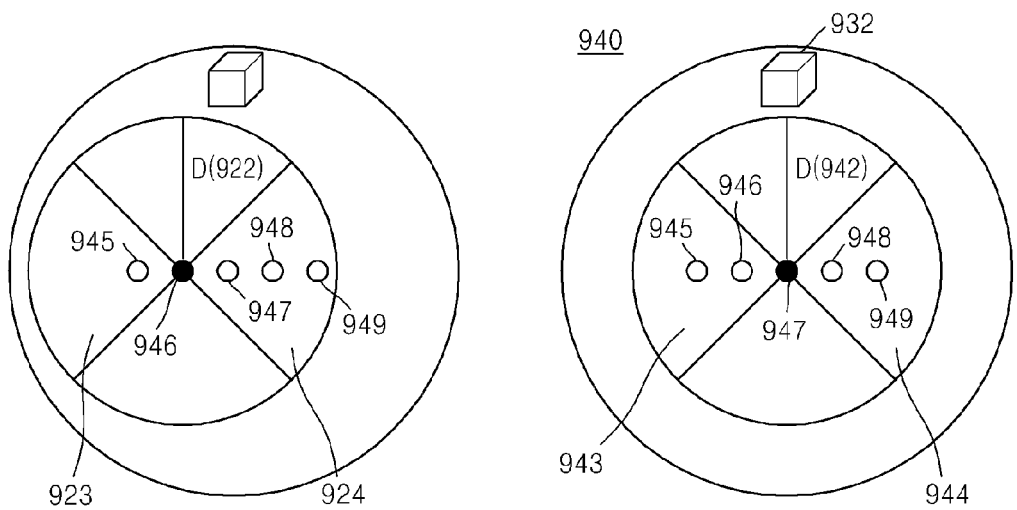
FIG. 10A
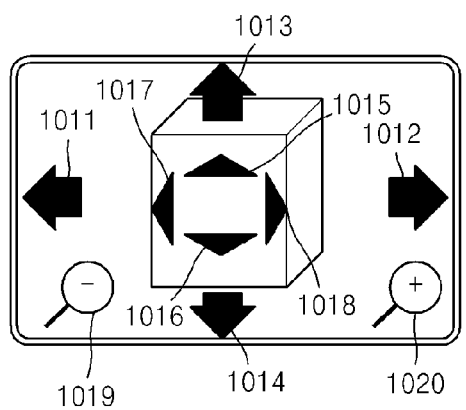

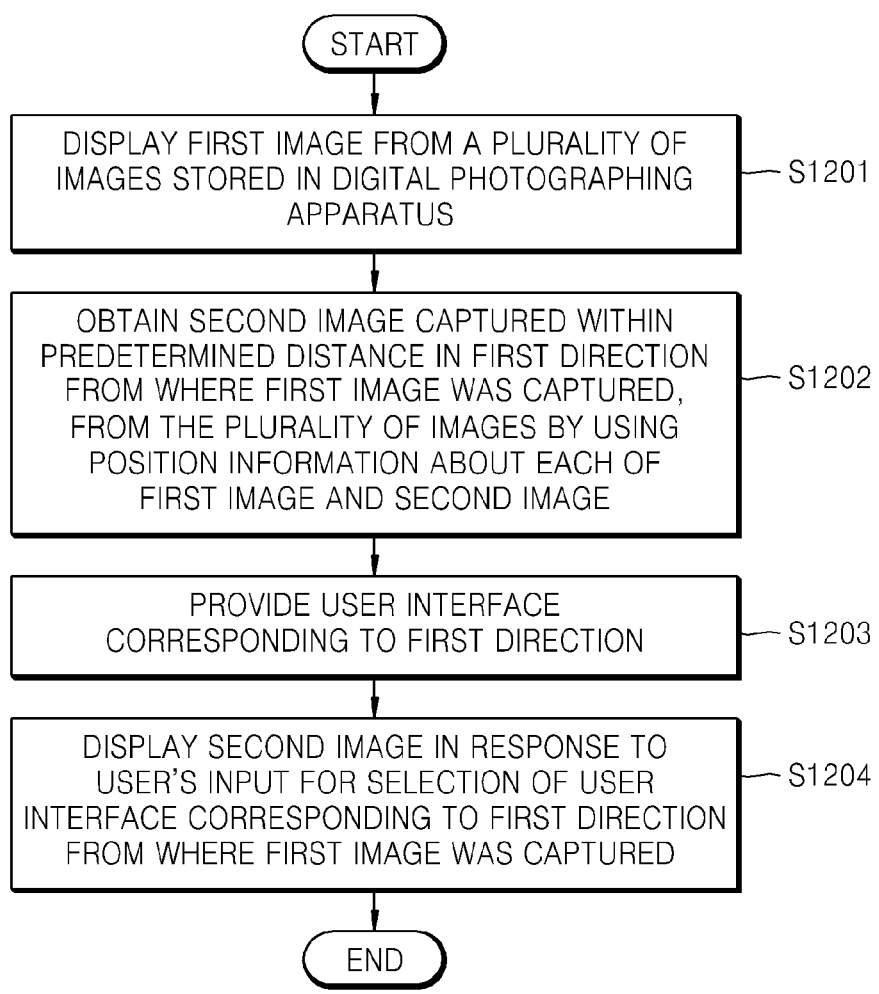

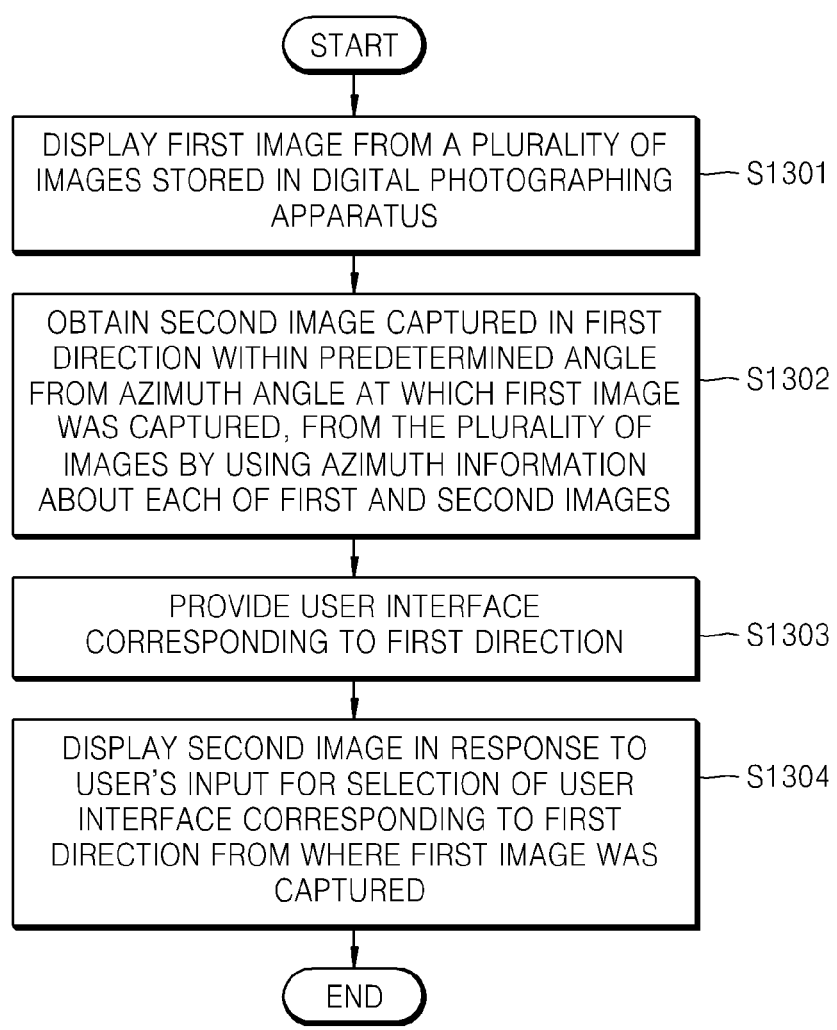

DIGITAL PHOTOGRAPHING APPARATUS AND METHOD OF PROVIDING IMAGE CAPTURED BY USING THE APPARATUS

CROSS-REFERENCE TO RELATED PATENT APPLICATION

This application claims the priority benefit of Korean Patent Application No. 10-2011-0006956, filed on Jan. 24, 2011, in the Korean Intellectual Property Office, the disclosure of which is incorporated herein in its entirety by reference.

BACKGROUND

1. Field

Embodiments relate to a digital photographing apparatus and a method of providing an image captured by using the digital photographing apparatus.

2. Description of the Related Art

When an image is captured by using a digital photographing apparatus, the digital photographing apparatus can store the captured image and position information about the captured image.

When the image stored in the digital photographing apparatus is displayed, the position information about the captured image may also be displayed. In this regard, a user can check where the displayed image was captured, by using the displayed position information.

SUMMARY

One or more embodiments include a digital photographing apparatus that captures and displays a first image and displays a second image captured within a predetermined distance in a first direction from where the first image was captured or a second image captured in the first direction within a predetermined angle from the first direction from a height or angle at which the first image was captured, a method of providing an image captured by using the digital photographing apparatus, and a non-transitory computer-readable recording medium having recorded thereon a computer program for executing the method.

According to an embodiment, a method of providing an image captured by using a digital photographing apparatus includes: displaying a first image from among a plurality of images stored in the digital photographing apparatus; obtaining a second image captured within a predetermined distance in a first direction from where the first image was captured, from the plurality of images by using position information about each of the first image and the second image; providing a user interface corresponding to the first direction; and displaying the second image in response to a user's input for selection of the user interface corresponding to the first direction.

The obtaining of the second image from the plurality of images may include: obtaining a third image captured within a predetermined distance in the first direction from where the first image was captured, by using the position information about each of the first image and the second image; and determining whether a distance from where the first image was captured to where the second image was captured is shorter than a distance from where the first image was captured to where the third image was captured.

The obtaining of the second image from the plurality of images may include obtaining a third image captured within a predetermined distance in a second direction different from the first direction from where the first image was captured, and the providing of the user interface corresponding to the first direction may include providing the user interface corresponding to the first direction and a user interface corresponding to the second direction.

The first image may be an image in which a first capture target is photographed, and the obtaining of the second image from the plurality of images may include obtaining the second image captured in a direction in which the first capture target is photographed from where the first image was captured.

The obtaining of the second image from the plurality of images may include determining whether there is an image captured within a predetermined distance in the first direction from where the first image was captured, and the providing of the user interface corresponding to the first direction may include providing the user interface corresponding to the first direction according to a result of the determination.

The obtaining of the second image from the plurality of images may include obtaining a third image captured within a predetermined angle from a height at which the first image was captured, from the plurality of images by using height information about each of the first image and the third image.

The obtaining of the second image from the plurality of images may include obtaining a third image captured within a predetermined angle from an azimuth angle at which the first image was captured, from the plurality of images by using azimuth information about each of the first image and the third image.

The obtaining of the second image from the plurality of images may include obtaining a third image captured within a predetermined zoom magnification from where the first image was captured, from the plurality of images by using zoom magnification information about each of the first image and the third image.

The user interface may display graphics in a region corresponding to the first direction from a center of the first image displayed, and may be activated by a manipulation unit corresponding to the first direction or by an inclination sensor corresponding to the first direction.

The providing of the user interface corresponding to the first direction may include displaying a distance in the first direction from where the first image was captured to where the second image was captured.

The providing of the user interface corresponding to the first direction may include displaying the number of images captured within a predetermined distance or a predetermined angle in the first direction where the first image was captured.

The displaying of the second image may include displaying the second image in a region in which the first image is displayed while being hidden.

According to another embodiment, a method of providing an image captured by using a digital photographing apparatus includes: displaying a first image from among a plurality of images stored in the digital photographing apparatus; obtaining a second image captured in a first direction within a predetermined angle from an azimuth angle at which the first image was captured, from the plurality of images by using azimuth information about each of the first image and the second image; providing a user interface corresponding to the first direction; and displaying the second image in response to a user's input for selection of the user interface corresponding to the first direction.

According to another embodiment, a method of providing an image captured by using a digital photographing apparatus includes: displaying a first image from among a plurality of images stored in the digital photographing apparatus; obtaining a second image captured in a first direction within a predetermined angle from a height at which the first image was captured, from the plurality of images by using height information about each of the first image and the second image; providing a user interface corresponding to the first direction; and displaying the second image in response to a user's input for selection of the user interface corresponding to the first direction.

According to another embodiment, a method of providing an image captured by using a digital photographing apparatus includes: displaying a first image from among a plurality of images stored in the digital photographing apparatus; obtaining a second image captured at a zoom magnification higher or lower than a zoom magnification at which the first image was captured, from where the first image was captured, from the plurality of images by using zoom magnification information about each of the first image and the second image; providing a user interface corresponding to at least one of the low and high zoom magnifications; and displaying the second image in response to a user's input for selection of the user interface corresponding to one of the low and high zoom magnifications.

According to another embodiment, a digital photographing apparatus includes: a storing unit that stores a plurality of images and position information about each of the plurality of images; a display unit that displays a first image from among the plurality of images and a user interface corresponding to a first direction; and a processor that obtains a second image captured within a predetermined distance in the first direction from where the first image was captured, from the plurality of images by using position information about each of the first image and the second image.

The processor may include: an obtaining unit that obtains a third image captured within a predetermined distance in the first direction from where the first image was captured, by using position information about each of the first image and the second image; and a determining unit that determines whether a distance from where the first image was captured to where the second image was captured is shorter than a distance from where the first image was captured to where the third image was captured.

The processor may include an obtaining unit that obtains a third image captured within a predetermined angle from a height at which the first image was captured, from the plurality of images by using height information about each of the first image and the third image.

The processor may include an obtaining unit that obtains a third image captured within a predetermined angle from an azimuth angle at which the first image was captured, from the plurality of images by using azimuth information about each of the first image and the third image.

The processor may include an obtaining unit that obtains a third image captured within a predetermined zoom magnification from where the first image was captured, from the plurality of images by using zoom magnification information about each of the first image and the third image.

The user interface may display graphics in a region corresponding to the first direction from a center of the first image displayed, and may be activated by a manipulation unit corresponding to the first direction or by an inclination sensor corresponding to the first direction.

According to another embodiment, a non-transitory computer-readable recording medium having recorded thereon a computer program for executing the method of providing an image captured by a digital photographing apparatus, wherein the computer program includes: displaying a first image from among a plurality of images stored in the digital photographing apparatus; obtaining a second image captured within a predetermined distance in a first direction from where the first image was captured, from the plurality of images by using position information about each of the first image and the second image; providing a user interface corresponding to the first direction; and displaying the second image in response to a user's input for selection of the user interface corresponding to the first direction.

BRIEF DESCRIPTION OF THE DRAWINGS

The above and other features and advantages will become more apparent by describing in detail exemplary embodiments with reference to the attached drawings in which:

FIG. 3A is a table listing file names of images captured within a predetermined distance from where a first image was captured, and additional information about the captured images, according to an embodiment;

FIG. 3B is a table listing file names of images captured within a predetermined distance from where a first image was captured, and additional information about the captured images, wherein the images and the additional information are arranged in a predetermined order, according to an embodiment;

FIG. 9 illustrates an operation of displaying a user interface for displaying a third image captured within a predetermined distance to the left of where a second image was captured, according to an embodiment;

FIG. 10A illustrates a user interface for displaying a second image, according to an embodiment;

FIG. 12 is a flowchart illustrating a method of providing an image captured by using the digital photographing apparatus illustrated in FIG. 1, according to an embodiment;

FIG. 13 is a flowchart illustrating a method of providing an image captured by using the digital photographing apparatus illustrated in FIG. 1, according to another embodiment;

DETAILED DESCRIPTION

Figure 1:
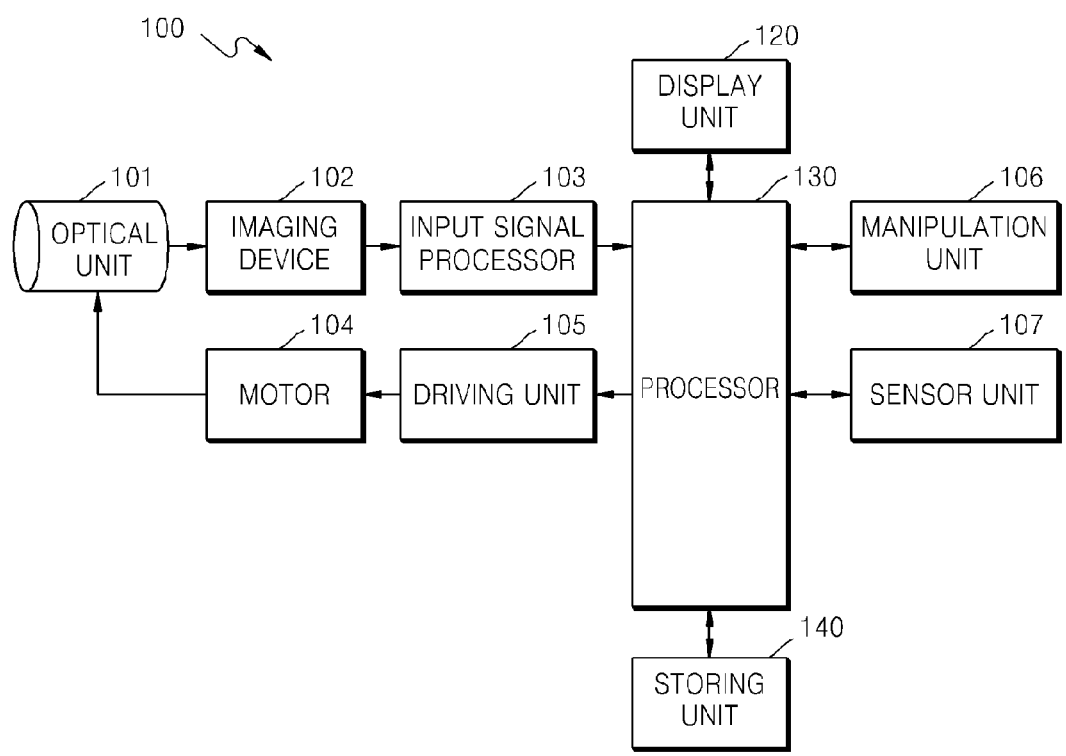
FIG. 1 is a block diagram of a digital photographing apparatus, according to an embodiment.

Reference will now be made in detail to exemplary embodiments, examples of which are illustrated in the accompanying drawings. However, exemplary embodiments are not limited to the embodiments illustrated hereinafter, and the embodiments herein are rather introduced to provide easy and complete understanding of the scope and spirit of exemplary embodiments. In the drawings, the thicknesses of layers and regions are exaggerated for clarity.

The terms, such as "embodiment", "example", "aspect", "illustration", and the like, used herein are not intended to be interpreted to mean that any aspect or design described herein is superior to or has an advantage with respect to other aspects or designs.

It will be understood that the following terms "component", "module", "system", "interface", and the like, are each generally referred to as a computer-related entity and each may be referred to as hardware, a combination of hardware and software, or software, for example.

In addition, the term "or" is intended to mean an "inclusive or" rather than an "exclusive or". In other words, unless otherwise defined or unless the context clearly indicates otherwise, the expression "x uses a or b" is referred to as any one of natural inclusive permutations.

In addition, the singular form ("a" or "an") used herein is intended to include the plural form ("two or more"), unless otherwise defined or the context clearly indicates otherwise.

It will be further understood that the term "and/or" used herein is or includes any and all combinations of one or more of the associated listed items.

It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of exemplary embodiments.

A structure of a digital camera as a digital photographing apparatus according to an embodiment will now be described. However, the digital photographing apparatus is not limited to the digital camera and may be applied to devices that may perform functions that are the same as or similar to those of the digital photographing apparatus, such as a camera phone, a personal digital assistant (PDA), a portable multimedia player (PMP), a camcorder, a smart phone, a lap top computer, a desk top computer, a digital television (TV), a digital frame, and the like. Here, images provided by the digital photographing apparatus may include photographs captured by the digital photographing apparatus, images generated by using a graphics program (for example, Photoshop, Paint), still images of/or moving images, reduced/extended images, partial regions of particular images, and images captured from a screen by a user or a device.

FIG. 1 is a block diagram of a digital photographing apparatus 100, according to an embodiment.

Referring to FIG. 1, the digital photographing apparatus 100 includes an optical unit 101, an imaging device 102, an input signal processor 103, a motor 104, a driving unit 105, a manipulation unit 106, a sensor unit 107, a display unit 120, a processor 130, and a storing unit 140.

A structure of the digital photographing apparatus 100 will now be described in detail.

The optical unit 101 may receive an optical signal from a subject. The optical unit 101 may include a lens that condenses an optical signal, a diaphragm that controls an amount of the optical signal, and a shutter that controls input of the optical signal. The lens may include, for example, a zoom lens that controls a viewing angle to be decreased or increased according to a focal length and a focus lens that focuses on the subject. The zoom lens and the focus lens may each be formed with one lens or a group of a plurality of lenses. The shutter may include a mechanical shutter in which a screen is moved upwards or downwards. Alternatively, instead of an additional shutter, the imaging device 102 may act as the shutter by controlling a supply of an electrical signal.

The motor 104 may drive the optical unit 101. For example, the motor 104 may drive a position of the lens, opening or closing of the diaphragm, and an operation of the shutter to allow the digital photographing apparatus 100 to perform operations such as auto-focusing, automatic exposure control, diaphragm control, zooming, focus changing, and the like.

The driving unit 105 may control the motor 104. For example, the driving unit 105 may control operation of the motor 104 according to a control signal input from the processor 130.

The imaging device 102 may convert an optical signal received by the optical unit 101 into an electrical signal. The imaging device 102 may be a charge coupled device (CCD) sensor array, a complementary metal oxide semiconductor (CMOS) sensor array, or the like.

The input signal processor 103 may digitally convert an electrical signal supplied by the imaging device 102 so as to generate a digital signal. In addition, the input signal processor 103 may perform gain control, noise reduction, signal processing for shaping a waveform, and the like on the electrical signal supplied by the imaging device 102.

The display unit 120 may display an image provided by the input signal processor 103 in real time or may display an image stored in the storing unit 140. The display unit 120 may also display information input by the user or information to be provided to the user, in various forms, such as an icon, a menu, a text, and the like. A liquid crystal display (LCD) device has been illustrated as an example of the display unit 106. However, this should not be construed as limiting. The display unit 106 may include an organic light-emitting diode (OLED), an electrophoresis display apparatus, or the like.

The manipulation unit 106 may include a member that allows the user to manipulate the digital photographing apparatus 100 or to perform various settings during a photographing operation. The manipulation unit 106 may be implemented in the form of a button, a key, a touch panel, a touch screen, a dial, or the like and may receive a user control signal instructing that an operation such as power on/off, photographing start/stop, reproduction start/stop/search, driving of an optical system, mode conversion, menu manipulation, selection manipulation, or the like is to be performed.

The sensor unit 107 may convert information about an inside or an outside of the digital photographing apparatus 100 into an electrical signal. The digital photographing apparatus 100 may not include the sensor unit 107.

The sensor unit 107 may include at least one of a position sensor, an azimuth sensor, a gradient sensor, and a height sensor. As an example, the position sensor may receive at least one satellite signal and may process the received signal, thereby determining a position of the digital photographing apparatus 100 on the earth. The position sensor may provide a latitude value, a longitude value, or the like of the digital photographing apparatus 100 based on the determined position. The azimuth sensor may measure an azimuth value of the digital photographing apparatus 100. For example, the azimuth sensor may measure an intensity or a flow of a magnetic field generated by the earth and may process the measured signal, thereby providing the azimuth value of the digital photographing apparatus 100. The gradient sensor may measure speed and gradient direction change of the digital photographing apparatus 100. For example, the gradient sensor may measure vector values on three axes such as an x-axis, a y-axis, and a z-axis and may provide displacement values corresponding to the three axes each hour. The height sensor may measure a height value of the digital photographing apparatus 100. For example, the height sensor may include one or more acceleration sensors and a magnetic sensor. The height sensor may provide the height value of the digital photographing apparatus 100 by using values of the three axes measured by the acceleration sensors and the magnetic sensor.

The storing unit 140 may include data required for operation of the digital photographing apparatus 100 and data in various forms for the user. For example, the storing unit 140 may include data input by the input signal processor 103, data used for an arithmetic operation, an algorithm required for operation of a digital camera, setting data, and the like and may store a processing result temporarily. In addition, the storing unit 140 may store an image file generated by compressing the data input by the input signal processor 103 and may also store files in various forms. An embedded memory embedded in the digital photographing apparatus 100 or an external memory may be used as the storing unit 140. The storing unit 140 may be Static Random Access Memory (SRAM), Dynamic Random Access Memory (DRAM), Read Only Memory (ROM), flash memory, a hard disk, a Secure Digital (SD) memory card, a Multi-Media Card (MMC), an optical disc, an optical magnetic disc, hologram memory, or the like.

The processor 130 may process an image by performing a digital operation. For example, the processor 130 may reduce noise that occurs in an image and may perform image signal processing such as gamma correction, color filter interpolation, color matrix, color correction, color enhancement, and the like, for improvement in image quality. In addition, the processor 130 may generate an image file by compressing an image generated by performing image signal processing and may restore the image from the generated image file. An image may be reversibly compressed or irreversibly compressed. An example of a proper format that an image may be compressed into may be a Joint Photographic Experts Group (JPEG) format or a JPEG 2000 format. The processor 130 may further perform functions such as sharpness processing, color processing, blur processing, edge emphasis processing, image interpretation processing, image recognition processing, image effect processing, and the like. The processor 130 may further perform image signal processing for displaying an image on the display unit 120. For example, the processor 130 may perform brightness level adjustment, color correction, contrast adjustment, contour emphasis adjustment, screen division processing, generation of a character image, image synthesis processing, and the like.

The processor 130 may perform the above-described image signal processing and may control each element according to a result of the processing. The processor 130 may further control each element according to a user control signal input by the manipulation unit 106.

Furthermore, the processor 120 may obtain a second image that was captured within a predetermined distance in a first direction from where a first image from among a plurality of images stored in the storing unit 140 was captured, from the plurality of images, and may provide the obtained second image to the display unit 120, in response to a user's input for selection of a user interface corresponding to the first direction.

Figure 2:
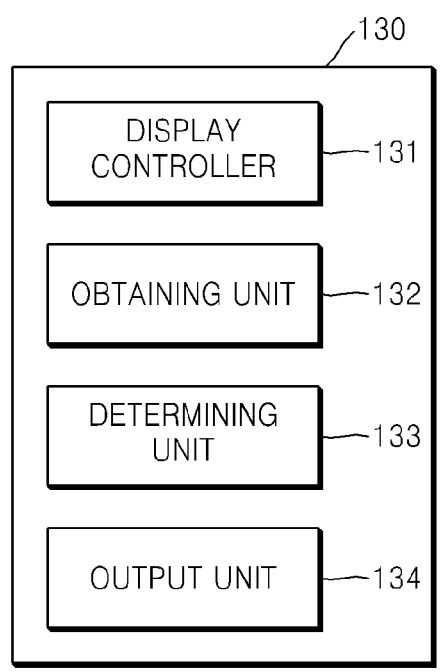
FIG. 2 is a block diagram of a processor of the digital photographing apparatus illustrated in FIG. 1, according to an embodiment.

FIG. 2 is a block diagram of the processor 130 of the digital photographing apparatus 100 illustrated in FIG. 1, according to an embodiment.

Referring to FIG. 2, the processor 130 may include a display controller 131, an obtaining unit 132, a determining unit 133, and an output unit 134.

The display controller 131 may provide at least one image and a user interface to the display unit 120. For example, the display controller 131 may display a first image stored in the storing unit 140 or an external device of the digital photographing apparatus 100 on the display unit 120. In addition, the display controller 131 may provide a user interface for displaying a second image stored in the storing unit 140 or the external device of the digital photographing apparatus 100 on the display unit 120. As an example, the display controller 131 may provide a user interface for displaying a second image that was captured within a predetermined distance in a first direction from where the first image was captured, on the display unit 120. As another example, the display controller 131 may provide a user interface for displaying a second image that was captured in a first direction within a predetermined angle from a height at which the first image was captured, on the display unit 120. As another example, the display controller 131 may provide a user interface for displaying a second image that was captured in a first direction within a predetermined angle from an azimuth angle at which the first image was captured, on the display unit 120. As another example, the display controller 131 may provide a user interface for displaying a second image that was captured at a zoom magnification different from a zoom magnification at which the first image was captured, from where the first image was captured, on the display unit 120. Here, the zoom magnification may be a zoom magnification at which a size of a subject in the first image is decreased or increased. The zoom magnification may be changed by controlling the focal length, for example.

When the first image is displayed on the display unit 120, the obtaining unit 132 may obtain a second image that was captured within a predetermined distance in a first direction from where the first image was captured, from the plurality of images stored in the storing unit 140 or the external device of the digital photographing apparatus 100. In this regard, the obtaining unit 132 may obtain the second image by using position information about each image. For example, the position information may be information of a Global Positioning System of the digital photographing apparatus 100 and may include latitude and longitude values of the digital photographing apparatus 100 at the time when the image was captured. In this regard, the first direction may be a direction from where the first image was captured to where the second image was captured. For example, the first direction may be one from among upward, downward, left, right, and diagonal directions.

According to another embodiment, the obtaining unit 132 may obtain a second image that was captured in a first direction within a predetermined angle from the height at which the first image was captured, from among the plurality of images stored in the storing unit 140 or the external device of the digital photographing apparatus 100. In this regard, the obtaining unit 132 may obtain the second image by using height information about each image. Here, the first direction may be a direction in which the second image was captured at the height at which the first image was captured. For example, the first direction may be an upward direction or a downward direction.

According to another embodiment, the obtaining unit 132 may obtain a second image that was captured in a first direction within a predetermined angle from the azimuth angle at which the first image was captured, from among the plurality of images stored in the storing unit 140 or the external device of the digital photographing apparatus 100. In this regard, the obtaining unit 132 may obtain the second image by using azimuth information about each of the first image and the second image. In this regard, the first direction may be a direction in which the second image was captured from where the first image was captured. For example, the first direction may be a left or right direction.

According to another embodiment, the obtaining unit 132 may obtain a second image that was captured at a predetermined zoom magnification from where the first image was captured, from among the plurality of images stored in the storing unit 140 or the external device of the digital photographing apparatus 100. In this regard, the second image may be obtained by using zoom magnification information about each of the first image and the second image. In this regard, the predetermined zoom magnification may be a high or low zoom magnification based on the zoom magnification at which the first image was captured.

Additional information such as position information, height information, azimuth information, zoom magnification, and the like about an image may be stored in the storing unit 140 together with the image or as a separate file. For example, a file of an image including additional information may have a structure based on an Exif format.

FIG. 3A is a table listing file names of images captured within a predetermined distance from where a first image was captured, and additional information about the captured images, according to an embodiment. The obtaining unit 132 may obtain at least one image captured within the predetermined distance from where the first image was captured.

Reference numerals 302, 304, 306, and 308 illustrated in FIG. 3A represent examples of images respectively captured in upward, downward, left, and right directions within a predetermined distance from where the first image was captured. Each of the images may correspond to distance information about a distance in a corresponding direction from where the first image was captured. Reference numerals 310 and 312 of FIG. 3A represent examples of images captured in an upward direction or a downward direction within a predetermined angle from a height at which the first image was captured. Each of the images may correspond to angle information about an angle inclined in a corresponding direction with respect to the height at which the first image was captured.

Reference numerals 314 and 316 of FIG. 3A represent examples of images captured in a left or right direction within a predetermined angle from an azimuth angle at which the first image was captured. Each of the images may correspond to angle information about an angle inclined in a corresponding direction with respect to the azimuth at which the first image was captured. Reference numerals 318 and 320 of FIG. 3A represent examples of images captured at a high or low zoom magnification from where the first image was captured. Each of the images may be classified according to the high or low zoom magnification based on the zoom magnification at which the first image was captured. For example, when the zoom magnification at which the first image was captured is 2×, the high zoom magnification may be 3× or 4×, and the low zoom magnification may be 1×.

When there are a plurality of images captured within a predetermined distance in a first direction from where the first image was captured, the determining unit 133 may compare distances from where the first image was captured to where each of the images was captured, by using distance information about each of the images. The determining unit 133 may arrange each of the images according to sizes of the distances. For example, the determining unit 133 may arrange the plurality of images in the order of an image captured at a position closest to where the first image was captured to an image captured at a position farthest from where the first image was captured.

According to another embodiment, when there are a plurality of images captured in a first direction within a predetermined angle from the height at which the first image was captured, the determining unit 133 may compare angles from the height at which the first image was captured to a height at which each of the images was captured, by using angle information about each of the images. The determining unit 133 may arrange each of the images according to sizes of the angles. For example, the determining unit 133 may arrange the plurality of images in the order of an image captured at a height closest to the height at which the first image was captured to an image captured at a height farthest from the height at which the first image was captured.

According to another embodiment, when there are a plurality of images captured in a first direction within a predetermined angle from the azimuth angle at which the first image was captured, the determining unit 133 may compare azimuth angles from the azimuth angle at which the first image was captured to an azimuth angle at which each of the images was captured, by using angle information about each of the images. The determining unit 133 may arrange each of the images according to sizes of the angles. For example, the determining unit 133 may arrange the plurality of images in the order of an image captured at an azimuth angle closest to the azimuth angle at which the first image was captured to an image captured at an azimuth angle farthest from the azimuth angle at which the first image was captured.

According to another embodiment, when there are a plurality of images captured at a low or high zoom magnification, the determining unit 133 may compare zoom magnifications of the images by using zoom magnification information of each of the images. The determining unit 133 may arrange each of the images according to sizes of the zoom magnifications. For example, the determining unit 133 may arrange the plurality of images in the order of an image captured at a low magnification to an image captured at a high magnification based on the zoom magnification at which the first image was captured.

FIG. 3B is a table listing file names of images captured within a predetermined distance from where a first image was captured, and additional information about the captured images, wherein the images and the additional information are arranged in a predetermined order, according to an embodiment. The determining unit 133 may arrange at least one image obtained by the obtaining unit 132 in a predetermined order.

According to reference numerals 322, 324, 326, and 328 illustrated in FIG. 3B, the determining unit 133 may arrange a plurality of images in upward, downward, left, or right directions in the order of an image captured at a position closest to where the first image was captured to an image captured at a position farthest from where the first image was captured. Each of the images may correspond to distance information about a distance in an upward, downward, left, or right direction from where the first image was captured. According to reference numerals 330 and 332 of FIG. 3B, the determining unit 133 may arrange a plurality of images in an upward direction or a downward direction in the order of an image captured at a height closest to a height at which the first image was captured to an image captured at a height farthest from the height at which the first image was captured. Each of the images may correspond to angle information about an angle inclined in an upward direction or a downward direction with respect to the height at which the first image was captured. According to reference numerals 334 and 336 of FIG. 3B, the determining unit 133 may arrange a plurality of images in the left or right direction in the order of an image captured at an azimuth angle closest to an azimuth angle at which the first image was captured to an image captured at an azimuth angle farthest from the azimuth angle at which the first image was captured. Each of the images may correspond to angle information about an angle inclined in the left or right direction with respect to the height at which the first image was captured. According to reference numerals 338 and 340 of FIG. 3B, the determining unit 133 may arrange a plurality of images at a high or low zoom magnification compared to the zoom magnification at which the first image was captured, according to sizes of zoom magnifications from where the first image was captured. Each of the images may correspond to zoom magnification information about a magnification.

The output unit 134 may display a second image stored in the storing unit 140 or the external device of the digital photographing apparatus 100 on the display unit 120. In this regard, the second image may be displayed on a region in which a first image is displayed. As an example, the second image may be displayed in the region in which the first image is displayed while being hidden. Alternatively, at least part of the second image may be displayed in the region in which the first image is displayed. Alternatively, at least part of the second image may be displayed in the region in which the first image is displayed, together with at least part of the first image.

According to an embodiment, the output unit 134 may display a plurality of images arranged by the determining unit 133 sequentially from an image captured at a position closest to where the first image was captured to an image captured at a position farthest from where the first image was captured, on the display unit 120 in response to a user's input. According to another embodiment, the output unit 134 may display a plurality of images arranged by the determining unit 133 sequentially from an image captured at a height closest to a height at which the first image was captured to an image captured at a height farthest from the height at which the first image was captured, on the display unit 120 in response to a user's input. According to another embodiment, the output unit 130 may display a plurality of images arranged by the determining unit 133 sequentially from an image captured at an azimuth angle closest to an azimuth angle at which the first image was captured to an image captured at an azimuth angle farthest from the azimuth angle at which the first image was captured, on the display unit 120 in response to a user's input.

According to another embodiment, the output unit 130 may display the plurality of images arranged by the determining unit 133 sequentially from an image captured at a low magnification to an image captured at a high magnification based on a zoom magnification at which the first image was captured.

The output unit 134 may display a distance in a first direction from where the first image was captured to where a second image was captured. In addition, the output unit 134 may display an angle from the height at which the first image was captured to a height at which a second image was captured in a first direction. The output unit 134 may further display an angle from the azimuth angle at which the first image was captured to an azimuth angle at which a second image was captured in a first direction. The output unit 134 may further display a zoom magnification at which the second image was captured at a zoom magnification.

The output unit 134 may display a number of images captured within a predetermined distance from where a first image was captured. In addition, the output unit 134 may display a number of images captured within a predetermined angle from a height at which the first image was captured. The output unit 134 may further display a number of images captured within a predetermined angle from an azimuth angle at which the first image was captured. The output unit 134 may further display a number of images captured at zoom magnifications different from a zoom magnification at which the first image was captured.

Figure 4:
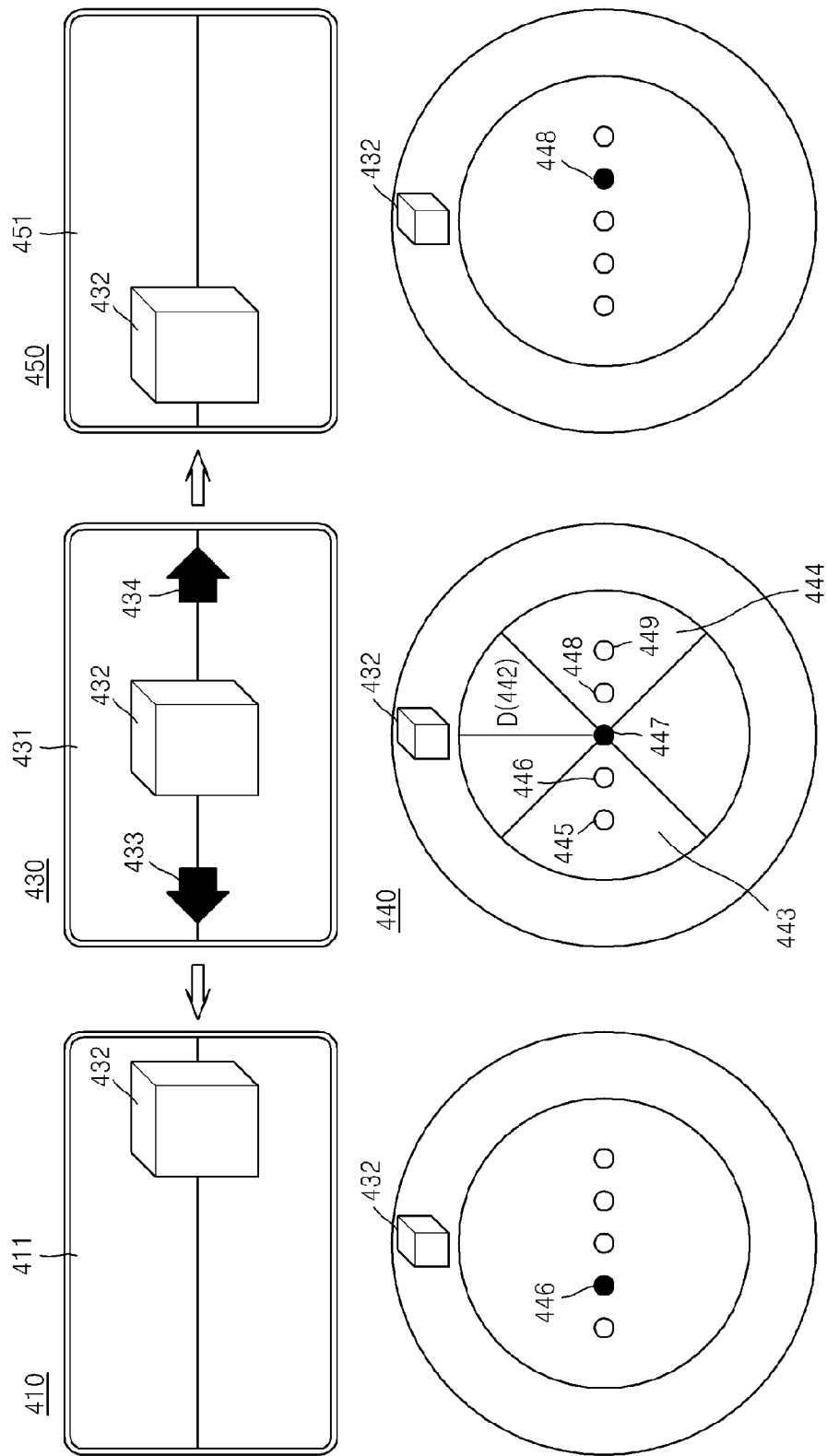
FIG. 4 illustrates an operation of displaying a second image captured within a predetermined distance in a left or right direction from where a first image was captured, according to an embodiment.

FIG. 4 illustrates an operation of displaying a second image captured within a predetermined distance in a left or right direction from where a first image was captured, according to an embodiment.

According to reference numeral 430 of FIG. 4, the display unit 120 may display a first image 431 in which a first capture target 432 is photographed. Reference numeral 440 of FIG. 4 represents an aerial view corresponding to when the first image 431 was captured. According to reference numeral 440 of FIG. 4, a position 447 is where the first capture target 432 was photographed and a direction from the position 447 to the first target 432 is a direction in which the first capture target 432 was photographed, and other positions 445, 446, 448, and 449 may be indicated on the aerial view. In this regard, the first capture target 432 may be photographed within a predetermined angle from the direction in which the first capture target 432 was photographed. For example, the predetermined angle may be a value from −90° to +90°.

According to reference numeral 430 of FIG. 4, the display unit 120 may further display user interfaces 433 and 434 for obtaining a second image. When there is a position at which the first capture target 432 may be photographed in a region 443 within a predetermined distance 442 to the left of the position 447, the display unit 120 may display the left user interface 433. For example, the positions 445 and 446 may be positions where the first capture target 432 may be photographed to the left of the position 447. When there is a position at which the first capture target 432 may be photographed in a region 444 within a predetermined distance 442 to the right of the position 447, the display unit 120 may display the right user interface 434. For example, the positions 448 and 449 may be positions where the first capture target 432 may be photographed to the right of the position 447.

Reference numeral 410 of FIG. 4 represents a case where the user selects the left user interface 433. A second image 411 captured in the region 443 may be displayed on the display unit 120 in response to the user's selection. In this regard, when there are a plurality of images captured in the region 443, the second image 411 may be an image captured at the position 446, which is the closest position to the position 447 on the left of the position 447. Reference numeral 450 of FIG. 4 represents a case where the user selects the right user interface 434. A second image 451 captured in the region 444 may be displayed on the display unit 120. In this regard, when there are a plurality of images captured in the region 444, the second image 451 may be an image captured at the position 448, which is the closest position to the position 447 on the right of the position 447.

Figure 5:
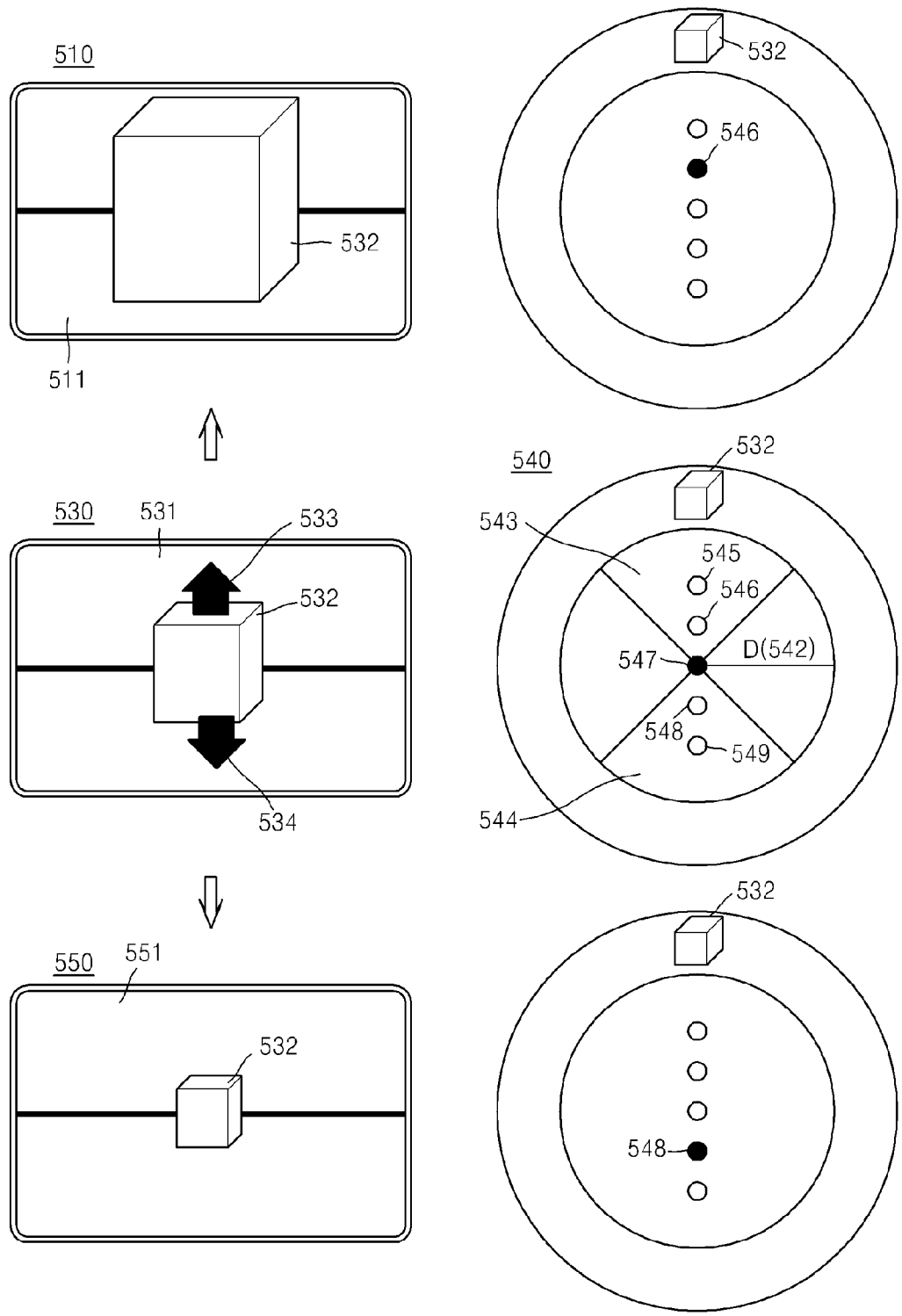
FIG. 5 illustrates an operation of displaying a second image captured within a predetermined distance in an upward or downward direction from where a first image was captured, according to an embodiment.

FIG. 5 illustrates an operation of displaying a second image captured within a predetermined distance in an upward direction or a downward direction from where a first image was captured, according to an embodiment.

According to reference numeral 530 of FIG. 5, the display unit 120 may display a first image 531 in which a first capture target 532 is photographed. Reference numeral 540 of FIG. 5 represents an aerial view corresponding to when the first image 531 was captured. According to reference numeral 540 of FIG. 5, a position 547 is where the first capture target 532 was photographed and a direction from the position 547 to the first capture target 532 is a direction in which the first capture target 532 was photographed, and other positions 545, 546, 548, and 549 may be indicated on the aerial view. In this regard, the first capture target 532 may be photographed within a predetermined angle from the direction in which the first capture target 532 was photographed. For example, the predetermined angle may be a value from −90° to +90°.

According to reference numeral 530 of FIG. 5, the display unit 120 may further display user interfaces 533 and 534 for obtaining a second image. When there is a position at which the first capture target 532 may be photographed in a region 543 within a predetermined distance 542 upward from the position 547, the display unit 120 may display the upward user interface 533. For example, the positions 545 and 546 may be positions where the first capture target 532 may be photographed upward from the position 547. When there is a position at which the first capture target 532 may be photographed in a region 544 within the predetermined distance 542 downward from the position 547, the display unit 120 may display the downward user interface 534. For example, the positions 548 and 549 may be positions where the first capture target 532 may be photographed downward from the position 547.

Reference numeral 510 of FIG. 5 represents a case where the user selects the upward user interface 533. A second image 511 captured in the region 543 may be displayed on the display unit 120 in response to the user's selection. In this regard, when there are a plurality of images captured in the region 543, the second image 511 may be an image captured at the position 546, which is a position closest to the position 547 and upward from the position 547. Reference numeral 550 of FIG. 5 represents a case where the user selects the downward user interface 534. A second image 551 captured in the region 544 may be displayed on the display unit 120 in response to the user's selection. In this regard, when there are a plurality of images captured in the region 544, the second image 551 may be an image captured at the position 548, which is a position closest to the position 547 and downward from the position 547.

Figure 6:
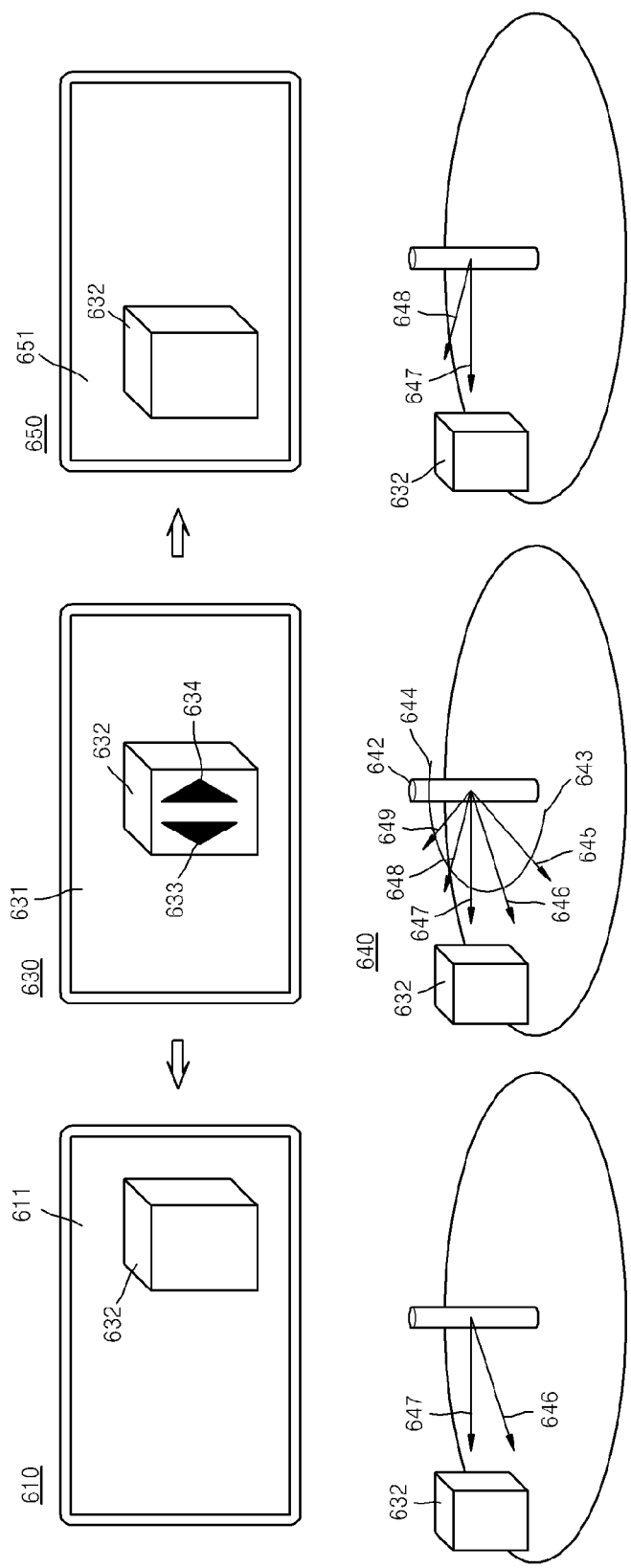
FIG. 6 illustrates an operation of displaying a second image captured within a predetermined angle to the left or right direction from an azimuth angle at which a first image was captured, according to an embodiment.

FIG. 6 illustrates an operation of displaying a second image captured within a predetermined angle in a left or right direction from an azimuth angle at which a first image was captured, according to an embodiment.

According to reference numeral 630 of FIG. 6, the display unit 120 may display a first image 631 in which a first capture target 632 is photographed. Reference numeral 640 of FIG. 6 represents an aerial view corresponding to when the first image 631 was captured. According to reference numeral 640 of FIG. 6, an azimuth angle 647 at which the first image 631 was captured, a position 642 at which the first image 631 was captured, and other azimuth angles 645, 646, 648, and 649 within a predetermined angle from the azimuth angle 647 may be indicated on the aerial view. In this regard, a second image may be captured within a predetermined distance from where the first image 631 was captured. For example, when position information about an image is a coordinate comprised of a latitude and a longitude of the image, the predetermined distance may be determined in consideration of a distance at which different coordinate values are differentiated from one another. Alternatively, the predetermined distance may be set in advance by the user or by using the digital photographing apparatus 100. In addition, a second image may be captured within a predetermined angle from an azimuth angle at which the first capture target 632 was photographed. For example, the predetermined angle may be a value from −90° to +90°.

According to reference numeral 630 of FIG. 6, the display unit 120 may further display user interfaces 633 and 634 for obtaining a second image. When there is a second image captured within a predetermined angle 643 to the left of the azimuth angle 647, the display unit 120 may display the left user interface 633. For example, the azimuth angles 645 and 646 may be azimuth angles at which the second image may be captured to the left of the azimuth angle 647. When there is a second image captured within a predetermined angle 644 to the right of the azimuth angle 647, the display unit 120 may display the right user interface 634. For example, the azimuth angles 648 and 649 may be azimuth angles at which the second image may be captured to the right of the azimuth angle 647.

Reference numeral 610 of FIG. 6 represents a case where the user selects the left user interface 633. A second image 611 captured within the predetermined angle 643 to the left of the azimuth angle 647 may be displayed on the display unit 120 in response to the user's selection. In this regard, when there are a plurality of images captured within the predetermined angle 643, the second image 611 may be an image captured at the azimuth angle 646, which is an angle closest to the azimuth angle 647 and to the left of the azimuth angle 647.

Reference numeral 650 of FIG. 6 represents a case where the user selects the right user interface 634. A plurality of images captured within the predetermined angle 644 to the right of the azimuth angle 647 are displayed on the display unit 120 in response to the user's selection, a second image 651 may be an image captured at the azimuth angle 648, which is an angle closest to the azimuth angle 647 and to the right of the azimuth angle 647.

Figure 7:
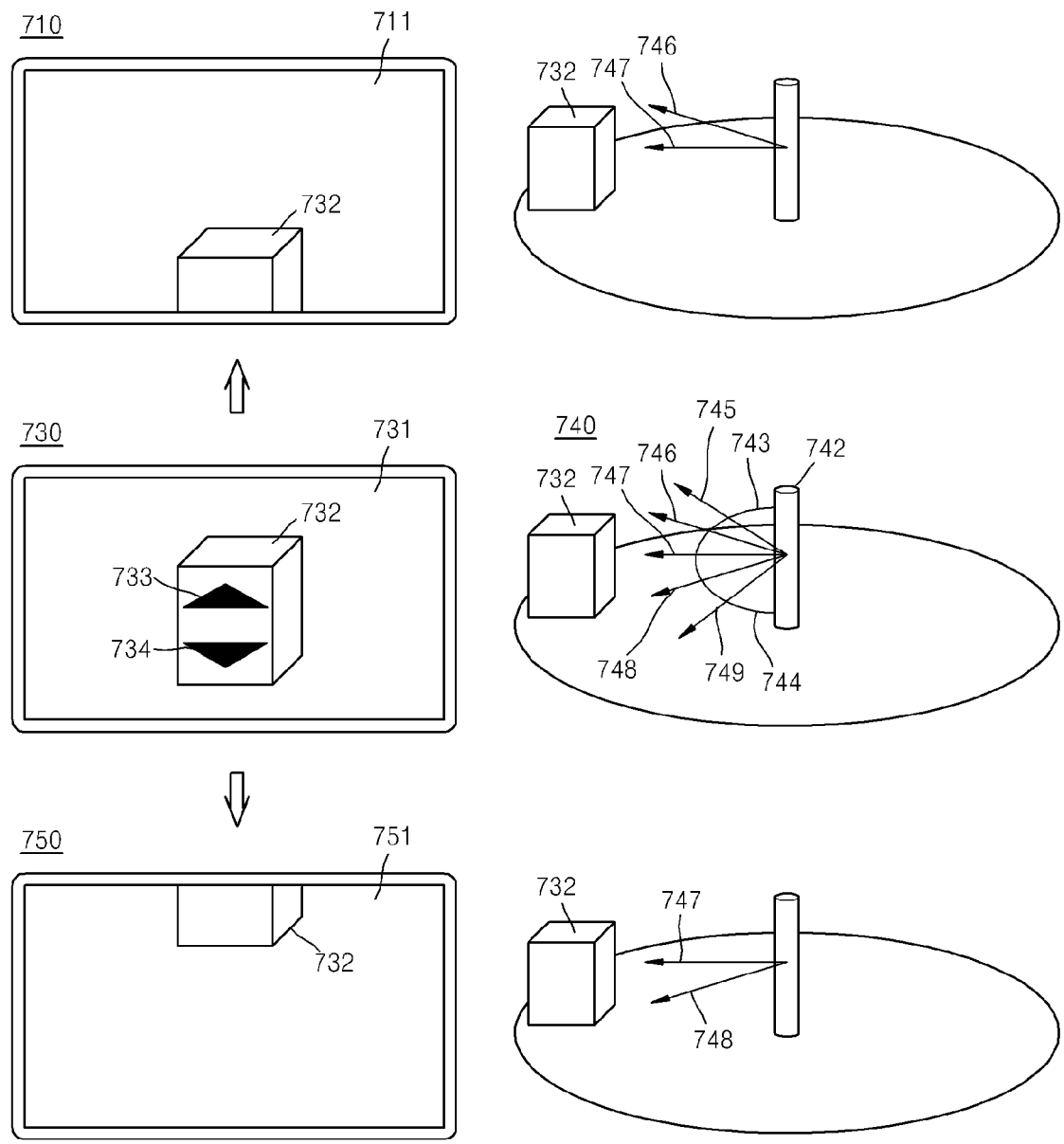
FIG. 7 illustrates an operation of displaying a second image captured within a predetermined angle upward or downward from a height at which a first image was captured, according to an embodiment.

FIG. 7 illustrates an operation of displaying a second image captured within a predetermined angle upward or downward from a height at which a first image was captured, according to an embodiment.

According to reference numeral 730 of FIG. 7, the display unit 120 may display a first image 731 in which a first capture target 732 is photographed. Reference numeral 740 of FIG. 7 represents an aerial view corresponding to when the first image 731 was captured. According to reference numeral 740 of FIG. 7, an azimuth angle 747 at which the first image 731 was captured, a position 742 at which the first image 731 was captured, and other azimuth angles 745, 746, 748, and 749 within a predetermined angle from the azimuth angle 747 may be indicated on the aerial view. In this regard, a second image may be captured within a predetermined distance from where the first image 731 was captured. For example, when position information about an image is a coordinate comprised of a latitude and a longitude of the image, the predetermined distance may be determined in consideration of a distance at which different coordinate values are differentiated from one another. Alternatively, the predetermined distance may be set in advance by the user or by using the digital photographing apparatus 100. Alternatively, the second image may be captured within a predetermined angle from a height at which the first capture target 732 was photographed. For example, the predetermined angle may be a value from −90° to +90°.

According to reference numeral 730 of FIG. 7, the display unit 120 may further display user interfaces 733 and 734 for obtaining a second image. When there is a second image captured within a predetermined angle 743 upward from the height 747, the display unit 120 may display the upward user interface 733. For example, the heights 745 and 746 may be heights at which the second image may be captured upward from the height 747. When there is a second image captured within a predetermined angle 744 downward from the azimuth angle 747, the display unit 120 may display the downward user interface 734. For example, the heights 748 and 749 may be heights at which the second image may be captured downward from the height 747.

Reference numeral 710 of FIG. 7 represents a case where the user selects the upward user interface 733. A second image 711 captured within the predetermined angle 743 upward from the height 747 may be displayed on the display unit 120 in response to the user's selection. In this regard, when there are a plurality of images captured within the predetermined angle 743, the second image 711 may be an image captured at the angle 746, which is an angle closest to the height 747 and upward from the height 747.

Reference numeral 750 of FIG. 7 represents a case where the user selects the downward user interface 734. An image captured within the predetermined angle 744 downward from the height 747 may be displayed on the display unit 120 in response to the user's selection. A second image 751 may be an image captured at the angle 748, which is an angle closest to the height 747 and downward from the height 747.

Figure 8:
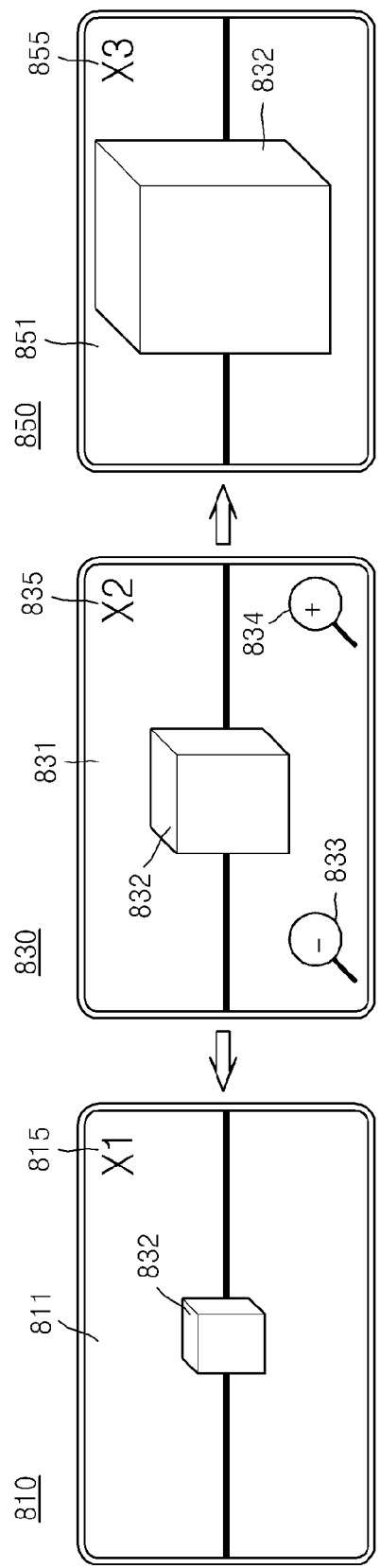
FIG. 8 illustrates an operation of displaying a second image captured at a second zoom magnification that is different from a first zoom magnification at which a first image was captured, according to an embodiment.

FIG. 8 illustrates an operation of displaying a second image captured at a second zoom magnification that is different from a first zoom magnification at which a first image was captured, according to an embodiment.

According to reference numeral 830 of FIG. 8, the display unit 120 may display a first image 831 in which a first capture target 832 is photographed at a first zoom magnification 835.

According to reference numeral 830 of FIG. 8, the display unit 120 may further display user interfaces 833 and 834 for obtaining a second image. When there is a second image captured in a direction in which the first capture target 832 was photographed at a high zoom magnification from where the first capture target 832 was photographed, the display unit 120 may display the user interface 834 for a high zoom magnification. In addition, where there is a second image captured at a low zoom magnification from where the first capture target 832 was photographed, the display unit 120 may display the user interface 833 for a low zoom magnification.

Reference numeral 810 of FIG. 8 represents a case where the user selects the user interface 833 for a low zoom magnification. A second image 811 captured at a zoom magnification 815 lower than a zoom magnification 835 at which the first image 831 was captured may be displayed on the display unit 120 in response to the user's selection. In this regard, when there are a plurality of images captured at a low zoom magnification, the second image 811 may be an image that was captured at a zoom magnification closest to the zoom magnification at which the first image 831 was captured.

Reference numeral 850 of FIG. 8 represents a case where the user selects the user interface 834 for a high zoom magnification. A second image 851 captured at a zoom magnification 855 higher than the zoom magnification 835 at which the first image 831 was captured may be displayed on the display unit 120 in response to the user's selection. In this regard, when there are a plurality of images captured at a high zoom magnification, the second image 851 may be an image captured at a zoom magnification closest to the zoom magnification at which the first image 831 was captured.

FIG. 9 illustrates an operation of displaying a user interface for displaying a third image captured within a predetermined distance to the left of where a second image was captured, according to an embodiment.

In reference numeral 930 of FIG. 9, the display unit 120 may display a first image 931 in which a first capture target 932 is photographed. Reference numeral 940 of FIG. 9 represents an aerial view corresponding to when the first image 931 was captured. According to reference numeral 940 of FIG. 9, a position 947 is where the first capture target 932 was photographed and a direction from the position 947 to the first capture target 932 is a direction in which the first capture target 932 was photographed, and other positions 945, 946, 948, and 949 may be indicated on the aerial view.

According to reference numeral 930 of FIG. 9, the display unit 120 may further display user interfaces 933 and 934 for obtaining a second image. When there are positions 945 and 946 in which the first images 931 is captured in a region 943 within a predetermined distance to the left of the position 947, the display unit 120 may display the left user interface 933.

Reference numeral 910 of FIG. 9 represents a case where the user selects the left user interface 933. A second image 911 captured in the region 943 may be displayed on the display unit 120 in response to the user's selection. In this regard, when there are a plurality of images captured in the region 943, the second image 911 may be an image captured at the position 946 to the left of and closest to the position 947.

According to reference numeral 910 of FIG. 9, the display unit 120 may further display user interfaces 913 and 914 for obtaining a third image.

According to an embodiment, when there is another position 945 at which the third image was captured in the region 943 within a predetermined distance 942 to the left of the position 946, the display unit 120 may display the left user interface 913. In this regard, the third image captured in the region 943 within the predetermined distance 942 may be obtained when the first image 931 is displayed.

According to an aspect of an embodiment, when there is another position 945 in which the third image is captured in a region 923 within a predetermined distance 922 to the left of the position 946, the display unit 120 may display the left user interface 913. In this regard, the third image captured in the region 923 within the predetermined distance 922 may be obtained when the second image 911 is displayed.

According to another embodiment, when there are other positions 947, 948, and 949 at which the third image may be captured in a region 944 within a predetermined distance 942 to the right of the position 946, the display unit 120 may display the right user interface 914. In this regard, the third image captured in the region 944 within the predetermined distance 942 may be obtained when the first image 931 is displayed.

According to an aspect of another embodiment, when there are other positions 947, 948, and 949 at which the third image may be captured in a region 924 within a predetermined distance 922 to the right of the position 946, the display unit 120 may display the right user interface 914. In this regard, the third image captured in the region 924 within the predetermined distance 922 may be obtained when the second image 911 is displayed.

As described above, the operation of displaying a user interface for displaying a third image captured within a predetermined distance to the left of where a second image was captured may be used. In addition, a similar operation may be used to display a user interface for displaying a third image captured within a predetermined distance in a right, upward, or downward direction from where the second image was captured. Furthermore, the display unit 120 may display a user interface for displaying a third image captured within a predetermined angle to the left or right of an azimuth angle at which the second image was captured. The display unit 120 may further display a user interface for displaying a third image captured within a predetermined angle upward or downward from a height at which the second image was captured. The display unit 120 may display a user interface for displaying a third image captured at a zoom magnification higher than a zoom magnification at which a second image was captured. For example, the zoom magnification at which the third image was captured may be 3× and the zoom magnification at which the second image was captured may be 2×.

FIG. 10A illustrates a user interface for displaying a second image, according to an embodiment.

Referring to FIG. 10A, the display unit 120 may display user interfaces 1011, 1012, 1013, and 1014 for displaying a second image captured within a predetermined distance in a left, right, upward, or downward direction from where a first image was captured. In addition, the display unit 120 may display user interfaces 1017 and 1018 for displaying a second image captured within a predetermined angle to the left or right of an azimuth angle at which the first image was captured. The display unit 120 may further display user interfaces 1015 and 1016 for displaying a second image captured within a predetermined angle upward or downward from a height at which the first image was captured. The display unit 120 may further display user interfaces 1019 and 1020 for displaying a second image captured at a lower or higher zoom magnification compared to a zoom magnification at which the first image was captured. All or at least one of the user interfaces described above may be displayed on one screen of the display unit 120.

Figure 10B:
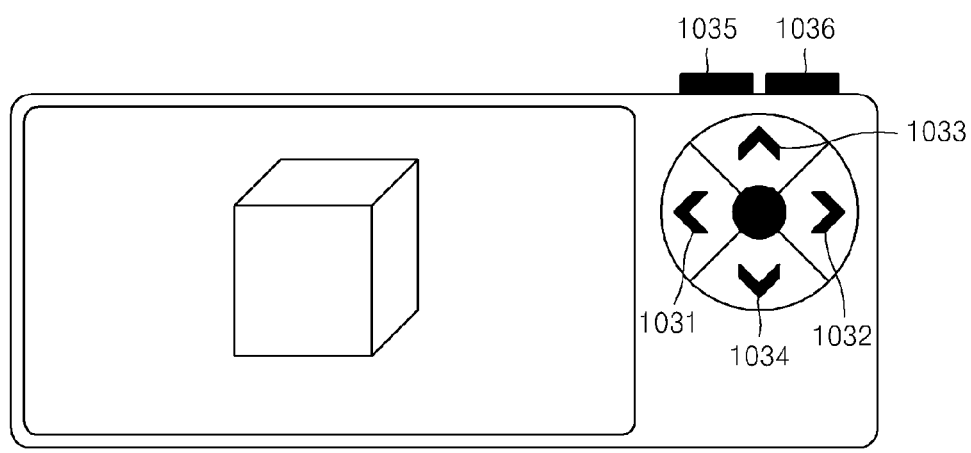
FIG. 10B illustrates a user interface for displaying a second image, according to another embodiment.

FIG. 10B illustrates a user interface for displaying a second image, according to another embodiment.

Referring to FIG. 10B, the manipulation unit 106 may activate user interfaces 1031, 1032, 1033, and 1034 for displaying a second image captured within a predetermined distance in a left, right, upward, or downward directions from where a first image was captured. For example, when the manipulation unit 106 detects that a user presses any of the user interfaces 1031 through 1034 for a predetermined amount of time or more, the display unit 120 may display a second image captured within the predetermined distance. In addition, the manipulation unit 106 may provide the user interfaces 1031 and 1032 for displaying the second image captured within a predetermined angle to the left or right of an azimuth angle at which the first image was captured. For example, when the manipulation unit 106 detects that the user presses either of the user interfaces 1031 and 1032 for a predetermined amount of time or less, the display unit 120 may display the second image captured within the predetermined angle to the left or right of the azimuth angle at which the first image was captured. The display unit 120 may display the user interfaces 1033 and 1034 for displaying a second image captured within a predetermined angle upward or downward from a height at which the first image was captured. For example, when the manipulation unit 106 detects that the user presses either of the user interfaces 1033 and 1034 for a predetermined amount of time or less, the display unit 120 may display the second image captured within the predetermined angle upward or downward from the height at which the first image was captured. The display unit 120 may further display the user interfaces 1035 and 1036 for displaying a second image captured at a lower or higher zoom magnification compared to a zoom magnification at which the first image was captured.

Figure 10C:
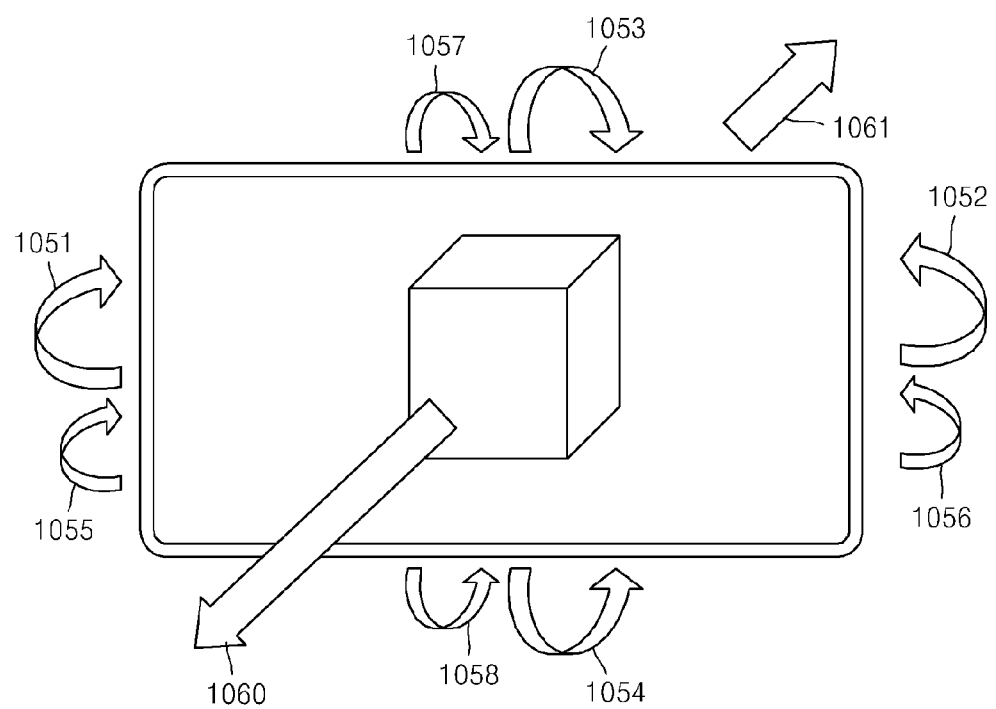
FIG. 10C illustrates a user interface for displaying a second image, according to another embodiment.

FIG. 10C illustrates a user interface for displaying a second image, according to another embodiment.

Referring to FIG. 10C, at least one inclination sensor of the sensor unit 107 corresponding to left directions 1051 and 1055, right directions 1052 and 1056, upward directions 1053 and 1057, downward directions 1054 and 1058, a forward direction 1060, and a backward direction 1061 may be activated so as to display a second image captured within a predetermined distance in a left, right, upward, or downward direction from where a first image was captured on the display unit 120. For example, when the user tilts the digital photographing apparatus 100 in the left direction 1051, the right direction 1052, the upward direction 1053, or the downward direction 1054 at a predetermined angle or speed or more, the display unit 120 may display the second image captured within the predetermined distance corresponding to the direction in which the digital photographing apparatus 100 is tilted. In addition, when the user tilts the digital photographing apparatus 100 in the left direction 1055 or the right direction 1056 at a predetermined angle or speed or less, the display unit 120 may display a second image captured in the left direction 1055 or the right direction 1056 within the predetermined angle. In addition, when the user tilts the digital photographing apparatus 100 in the upward direction 1057 or the downward direction 1058 at a predetermined angle or speed or less, the display unit 120 may display a second image captured in the upward direction 1057 or the downward direction 1058 within the predetermined angle. In addition, when the user moves the digital photographing apparatus 100 in the forward direction 1060, the display unit 120 may display a second image captured at a zoom magnification higher than a zoom magnification at which the first image was captured. In addition, when the user moves the digital photographing apparatus 100 in the backward direction 1061, the display unit 120 may display a second image captured at a zoom magnification than lower the zoom magnification at which the first image was captured.

Figure 11A:
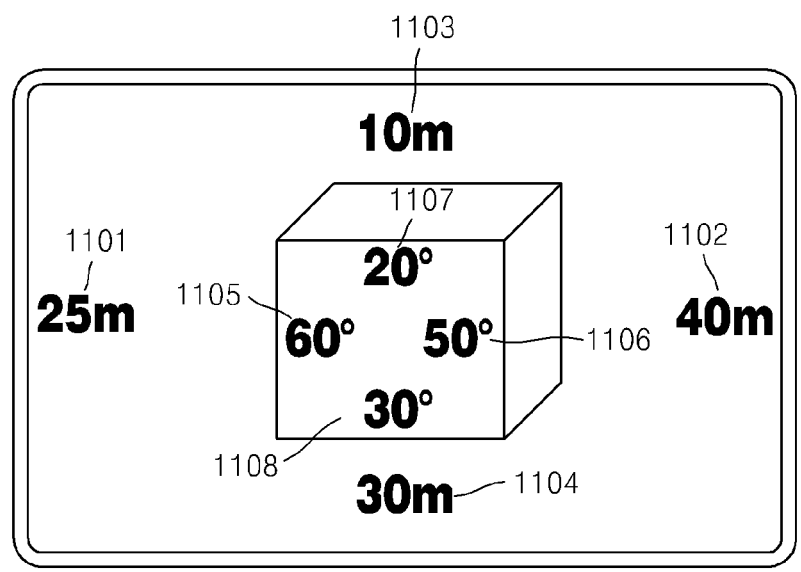
FIG. 11A illustrates additional information related to a second image, according to an embodiment.

FIG. 11A illustrates additional information related to a second image, according to an embodiment.

Referring to FIG. 11A, the display unit 120 may display a distance from a position where a first image was captured to where a second image was captured in a first direction from where the first image was captured. For example, the display unit 120 may display distances, e.g., reference numerals 1101, 1102, 1103, and 1104, from where the first image was captured to where the second image was captured in each of left, right, upward, and downward directions in regions corresponding to the directions. In addition, the display unit 100 may display angles, e.g., reference numerals 1105 and 1106, from an azimuth angle at which the first image was captured to an azimuth angle at which a second image was captured to the left or right of the azimuth angle at which the first image was captured. In addition, the display unit 100 may display angles, e.g., reference numerals 1107 and 1108, from a height at which the first image was captured to a height at which a second image was captured in an upward direction or downward from the height at which the first image was captured.

Figure 11B:
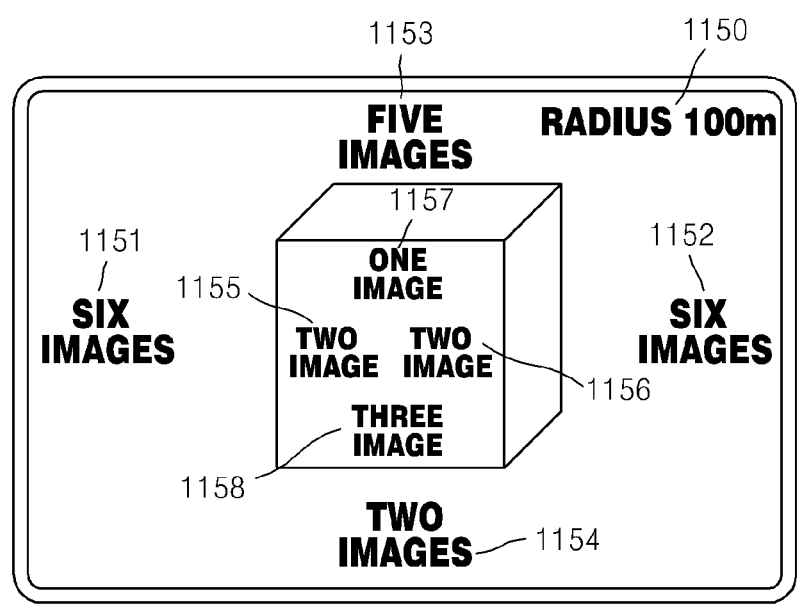
FIG. 11B illustrates additional information related to a second image, according to another embodiment.

FIG. 11B illustrates additional information related to a second image, according to another embodiment.

Referring to FIG. 11B, the display unit 120 may display the number of second images captured within a predetermined distance in a first direction from where a first image was captured. For example, the display unit 120 may display the number of second images, e.g., reference numerals 1151, 1152, 1153, and 1154, captured within a predetermined distance in each of left, right, upward, and downward directions from where the first image was captured. In addition, the display unit 120 may display the number of second images, e.g., reference numerals 1155 and 1156, captured to the left or right of an azimuth angle at which the first image was captured. In addition, the display unit 120 may display the number of second images, e.g., reference numerals 1157 and 1158, captured in an upward or downward direction from a height at which the first image was captured.

FIG. 12 is a flowchart illustrating a method of providing an image captured by using the digital photographing apparatus 100 illustrated in FIG. 1, according to an embodiment.

Referring to FIG. 12, the digital photographing apparatus 100 may display a first image from among a plurality of images stored in the storing unit 140 in operation S1201. Next, the digital photographing apparatus 100 may obtain a second image captured within a predetermined distance in a first direction from where the first image was captured, from the plurality of images by using position information about each of the first image and the second image in operation S1202. For example, in order to obtain the second image, the digital photographing apparatus 100 may determine whether a distance from where the first image was captured to where the second image was captured is shorter than a distance from where the first image was captured to where a third image was captured. When the first image is an image in which a first capture target is photographed and the second image is an image in which a second capture target is photographed, the second image may be an image captured within a predetermined angle from a direction in which the first capture target is photographed from where the first image was captured.

According to another embodiment, the digital photographing apparatus 100 may obtain a third image captured within a predetermined angle from a height at which the first image was captured, from the plurality of images by using height information about each of the first image and the third image.

According to another embodiment, the digital photographing apparatus 100 may obtain a third image captured within a predetermined angle from an azimuth angle at which the first image was captured, from the plurality of images by using azimuth information about each of the first image and the third image. According to another embodiment, the digital photographing apparatus 100 may obtain a third image captured at a predetermined zoom magnification from where the first image was captured, from the plurality of images by using zoom magnification information about each of the first image and the third image.

The digital photographing apparatus 100 may provide a user interface corresponding to the first direction in operation S1203. For example, the digital photographing apparatus 100 may determine whether there is an image captured within a predetermined distance in the first direction from where the first image was captured and may provide the user interface corresponding to the first direction according to a result of the determination. In addition, when the digital photographing apparatus 100 obtains a third image captured within a predetermined distance in a second direction different from the first direction from where the first image was captured, the digital photographing apparatus 100 may provide a user interface corresponding to each of the first direction and the second direction. In this regard, the user interface may be displayed as graphics in a region corresponding to the first direction from a center of the first image displayed, and may be activated by the manipulation unit 106 corresponding to the first direction or may be activated by an inclination sensor corresponding to the first direction.

The digital photographing apparatus 100 may further provide additional information corresponding to the first direction. For example, the digital photographing apparatus 100 may display a distance in the first direction from where the first image was captured to where the second image was captured. The digital photographing apparatus 100 may further display the number of images captured within a predetermined distance in the first direction from where the first image was captured.

The digital photographing apparatus 100 may display the second image in response to a user's input for selection of the user interface corresponding to the first direction from where the first image was captured in operation S1204. When the second image is displayed, the digital photographing apparatus 100 may further display the third image in response to an additional user's input for selection of the user interface corresponding to the first direction from where the second image was captured.

FIG. 13 is a flowchart illustrating a method of providing an image captured by using the digital photographing apparatus 100 illustrated in FIG. 1, according to another embodiment.

Referring to FIG. 13, the digital photographing apparatus 100 may display a first image from among a plurality of images stored in the storing unit 140 in operation S1301. Next, the digital photographing apparatus 100 may obtain a second image captured in a first direction within a predetermined angle from an azimuth angle at which the first image was captured, from the plurality of images by using azimuth information about each of the first and second images in operation S1302. For example, in order to obtain the second image, the digital photographing apparatus 100 may determine whether an angle from the azimuth angle at which the first image was captured to an azimuth angle at which the second image was captured is smaller than an angle from the azimuth angle at which the first image was captured to an azimuth angle at which a third image was captured.

The digital photographing apparatus 100 may provide a user interface corresponding to the first direction in operation S1303. For example, the digital photographing apparatus 100 may determined whether there is an image captured in the first direction within a predetermined angle from the azimuth angle at which the first image was captured and may provide the user interface corresponding to the first direction according to a result of the determination. In addition, when the digital photographing apparatus 100 obtains a third image captured in a second direction different from the first direction within a predetermined angle from the azimuth angle at which the first image was captured, the digital photographing apparatus 100 may provide the user interface corresponding to the first direction and a user interface corresponding to the second direction.

The digital photographing apparatus 100 may provide additional information corresponding to the first direction. For example, the digital photographing apparatus 100 may display an angle from the azimuth angle at which the first image was captured to an azimuth angle at which the second image was captured in the first direction.

The digital photographing apparatus 100 may display the second image in response to a user's input for selection of the user interface corresponding to the first direction from where the first image was captured in operation S1304. When the second image is displayed, the digital photographing apparatus 100 may further display the third image in response to an additional user's input for selection of the user interface corresponding to the first direction from where the second image was captured.

Figure 14:
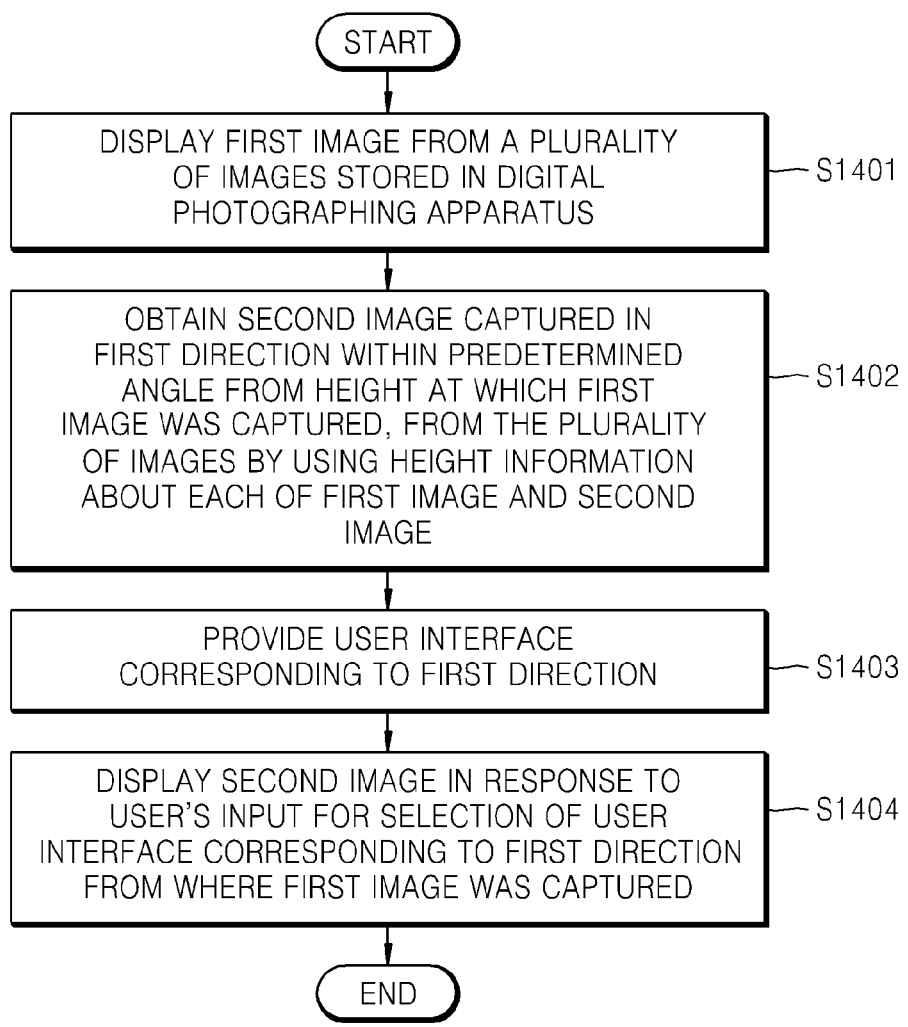
FIG. 14 is a flowchart illustrating a method of providing an image captured by using the digital photographing apparatus illustrated in FIG. 1, according to another embodiment.

FIG. 14 is a flowchart illustrating a method of providing an image captured by using the digital photographing apparatus 100 illustrated in FIG. 1, according to another embodiment.

Referring to FIG. 14, the digital photographing apparatus 100 may display a first image from among a plurality of images stored in the storing unit 140 in operation S1401. Next, the digital photographing apparatus 100 may obtain a second image captured in a first direction within a predetermined angle from a height at which the first image was captured, from the plurality of images by using height information about each of the first image and the second image in operation S1402. For example, in order to obtain the second image, the digital photographing apparatus 100 may determine whether an angle from the height at which the first image was captured to a height at which the second image was captured is smaller than an angle from the height at which the first image was captured to a height at which a third image was captured.

The digital photographing apparatus 100 may provide a user interface corresponding to the first direction in operation S1403. For example, the digital photographing apparatus 100 may determine whether there is an image captured in the first direction within a predetermined angle from the height at which the first image was captured and may provide the user interface corresponding to the first direction according to a result of the determination. In addition, when the digital photographing apparatus 100 obtains the third image captured in a second direction different from the first direction within a predetermined height from the height at which the first image was captured, the digital photographing apparatus 100 may provide the user interface corresponding to the first direction and a user interface corresponding to the second direction.

The digital photographing apparatus 100 may further provide additional information corresponding to the first direction. For example, the digital photographing apparatus 100 may display an angle from the height at which the first image was captured to the height at which the second image was captured in the first direction.

The digital photographing apparatus 100 may display the second image in response to a user's input for selection of the user interface corresponding to the first direction from where the first image was captured in operation S1404. When the second image is displayed, the digital photographing apparatus 100 may further display the third image in response to an additional user's input for selection of the user interface corresponding to the first direction from where the second image was captured.

Figure 15:
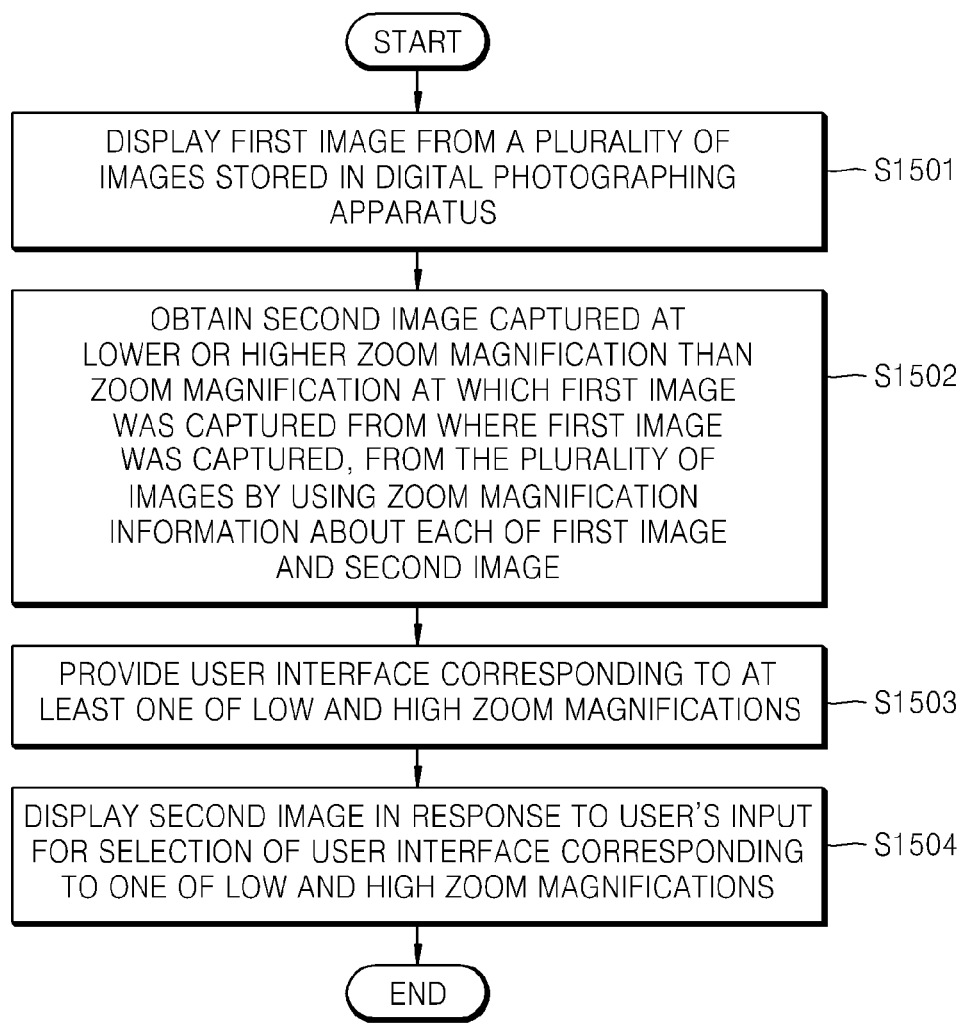
FIG. 15 is a flowchart illustrating a method of providing an image captured by using the digital photographing apparatus illustrated in FIG. 1, according to another embodiment.

FIG. 15 is a flowchart illustrating a method of providing an image captured by using the digital photographing apparatus 100 illustrated in FIG. 1, according to another embodiment.

Referring to FIG. 15, the digital photographing apparatus 100 may display a first image from among a plurality of images stored in the storing unit 140 in operation S1501. Next, the digital photographing apparatus 100 may obtain a second image captured at a lower or higher zoom magnification than a zoom magnification at which the first image was captured from where the first image was captured, from the plurality of images by using zoom magnification information about each of the first image and the second image in operation S1502.

The digital photographing apparatus 100 may provide a user interface corresponding to at least one of low and high zoom magnifications in operation S1503. For example, the digital photographing apparatus 100 may determine whether there is an image captured at a zoom magnification lower or higher than the zoom magnification at which the first image was captured from where the first image was captured and may provide the user interface corresponding to the low or high zoom magnification according to a result of the determination.

The digital photographing apparatus 100 may further provide additional information corresponding to the low or high zoom magnification. For example, the digital photographing apparatus 100 may display the zoom magnification at which the second image was captured.

The digital photographing apparatus 100 may display the obtained second image in response to a user's input for selection of the user interface corresponding to one of the low and high zoom magnifications in operation S1504. When the second image is displayed, the digital photographing apparatus 100 may further display a third image in response to an additional user's input for selection of the user interface corresponding to the low and high zoom magnifications from where the second image was captured.

The method of providing an image captured by using the digital photographing apparatus according to one or more embodiments may also be embodied as computer program commands that are executable by various computing devices and that may be recorded on a non-transitory computer-readable recording medium. The computer-readable recording medium may include program commands, data files, data structures, and the like separately or in combinations. The program commands to be recorded on the computer-readable recording medium may be particularly designed and configured for the embodiments or may be well-known to one of ordinary skill in the art of computer software. Examples of the computer commands include advanced language codes that are executable by a computer using an interpreter or the like as well as machine language codes formed by a compiler. The hardware device may be configured to operate as one or more software modules so as to perform operations of the embodiments, and vice versa.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as hardware devices such as read-only memory (ROM), random-access memory (RAM), or flash memory, magnetic media such as hard disks, floppy disks, and magnetic tapes, optical data storage devices or optical media such as compact disc read-only memory (CD-ROMs) or digital versatile discs (DVDs), a magneto-optical medium such as a floptical disc. The computer readable recording media may also be distributed over network coupled computer systems so that the computer readable code is stored and executed in a distributed fashion. This media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A method of displaying an image captured by using a digital photographing apparatus, the method comprising:
    displaying a first image from among a plurality of images stored in the digital photographing apparatus;
    displaying a graphic indicator denoting one or more user selectable directions;
    receiving user input of a selected first direction;
    retrieving a second image from among the plurality of stored images, wherein the second image is retrieved based on the user selected first direction so that the second image is related to the first image as having been captured within a predetermined distance in the first direction from where the first image was captured; and
    displaying the second image in response to receiving the user input,
    wherein the retrieving of the second image from the plurality of images comprises selecting the second image from the plurality of images that are arranged in the first direction according to a difference between a position at which each of the plurality of images was captured and a position at which the first image was captured.

2. The method of claim 1, wherein the retrieving of the second image from the plurality of images comprises:
    retrieving a third image captured within the predetermined distance in the first direction from where the first image was captured, by using position information about each of the first image and the second image; and
    determining whether a distance from where the first image was captured to where the second image was captured is shorter than a distance from where the first image was captured to where the third image was captured.

3. The method of claim 1, wherein the retrieving of the second image from the plurality of images comprises retrieving a third image captured within the predetermined distance in a second direction different from the first direction from where the first image was captured, and the providing of the graphic indicator corresponding to the first direction comprises providing the graphic indicator corresponding to the first direction and a graphic indicator corresponding to the second direction.

4. The method of claim 1, wherein the first image is an image in which a first capture target is photographed, and the retrieving of the second image from the plurality of images comprises retrieving the second image captured in a direction in which the first capture target is photographed from where the first image was captured.

5. The method of claim 1, wherein the retrieving of the second image from the plurality of images comprises determining whether there is an image captured within the predetermined distance in the first direction from where the first image was captured, and the providing of the graphic indicator corresponding to the first direction comprises providing the graphic indicator corresponding to the first direction according to a result of the determination.

6. The method of claim 1, wherein the retrieving of the second image from the plurality of images comprises retrieving a third image captured within a predetermined angle from a height at which the first image was captured, from the plurality of images by using height information about each of the first image and the third image.

7. The method of claim 1, wherein the retrieving of the second image from the plurality of images comprises retrieving a third image captured within a predetermined angle from an azimuth angle at which the first image was captured, from the plurality of images by using azimuth information about each of the first image and the third image.

8. The method of claim 1, wherein the retrieving of the second image from the plurality of images comprises retrieving a third image captured within a predetermined zoom magnification from where the first image was captured, from the plurality of images by using zoom magnification information about each of the first image and the third image.

9. The method of claim 1, wherein the graphic indicator displays graphics in a region corresponding to the first direction from a center of the first image displayed, and is activated by a manipulation unit corresponding to the first direction or by an inclination sensor corresponding to the first direction.

10. The method of claim 1, wherein the providing of the graphic indicator corresponding to the first direction comprises displaying a distance in the first direction from where the first image was captured to where the second image was captured.

11. The method of claim 1, wherein the providing of the graphic indicator corresponding to the first direction comprises displaying the number of images captured within the predetermined distance or a predetermined angle in the first direction where the first image was captured.

12. The method of claim 1, wherein the displaying of the second image comprises displaying the second image in a region in which the first image is displayed while being hidden.

13. A method of displaying an image captured by using a digital photographing apparatus, the method comprising:
displaying a first image from among a plurality of images stored in the digital photographing apparatus;
displaying a graphic indicator denoting one or more user selectable directions;
receiving user input of a selected first direction;
retrieving a second image from among the plurality of stored images, wherein the second image is retrieved based on the user selected first direction so that the second image is related to the first image as having been captured in the first direction within a predetermined angle from an azimuth angle at which the first image was captured; and
displaying the second image in response to receiving the user input,
wherein the retrieving of the second image from the plurality of images comprises selecting the second image from the plurality of images that are arranged in the first direction according to a difference between an azimuth angle at which each of the plurality of images was captured and an azimuth angle at which the first image was captured.

14. A method of displaying an image captured by using a digital photographing apparatus, the method comprising:
displaying a first image from among a plurality of images stored in the digital photographing apparatus;
displaying a graphic indicator denoting one or more user selectable directions;
receiving user input of a selected first direction;
retrieving a second image from among the plurality of stored images, wherein the second image is retrieved based on the user selected first direction so that the second image is related to the first image as having been captured in the first direction within a predetermined angle from a height at which the first image was captured; and
displaying the second image in response to receiving the user input,
wherein the retrieving of the second image from the plurality of images comprises selecting the second image from the plurality of images that are arranged in the first direction according to a difference between a height at which each of the plurality of images was captured and a height at which the first image was captured.

15. A method of displaying an image captured by using a digital photographing apparatus, the method comprising:
displaying a first image from among a plurality of images stored in the digital photographing apparatus;
displaying a graphic indicator denoting user selectable low or high magnifications;
receiving user input of a selected magnification;
retrieving a second image from among the plurality of stored images, wherein the second image is retrieved based on the user selected magnification so that the second image is related to the first image as having been captured at a zoom magnification higher or lower than the zoom magnification at which the first image was captured; and
displaying the second image in response to receiving the user input,
wherein the retrieving of the second image from the plurality of images comprises selecting the second image from the plurality of images that are arranged according to a difference between a zoom magnification at which each of the plurality of images was captured and a zoom magnification at which the first image was captured.

16. A digital photographing apparatus comprising:
a storing unit that stores a plurality of images and position information about each of the plurality of images;
a display unit that displays a first image from among the plurality of images and displays a graphic indicator denoting one or more user selectable directions;
a processor that:
receives user input of a selected first direction;
retrieves a second image from among the plurality of stored images, wherein the second image is related to the first image as having been captured within a predetermined distance in the first direction from where the first image was captured; and
a determining unit that arranges the plurality of images in the first direction according to a difference between a position at which each of the plurality of images was captured and a position at which the first image was captured.

17. The digital photographing apparatus of claim 16, wherein the processor comprises:

an obtaining unit that retrieves a third image captured within the predetermined distance in the first direction from where the first image was captured, by using position information about each of the first image and the second image; and the determining unit that determines whether a distance from where the first image was captured to where the second image was captured is shorter than a distance from where the first image was captured to where the third image was captured.

18. The digital photographing apparatus of claim 16, wherein the processor comprises an obtaining unit that retrieves a third image captured within a predetermined angle from a height at which the first image was captured, from the plurality of images by using height information about each of the first image and the third image.

19. The digital photographing apparatus of claim 16, wherein the processor comprises an obtaining unit that retrieves a third image captured within a predetermined angle from an azimuth angle at which the first image was captured, from the plurality of images by using azimuth information about each of the first image and the third image.

20. The digital photographing apparatus of claim 16, wherein the processor comprises an obtaining unit that retrieves a third image captured within a predetermined zoom magnification from where the first image was captured, from the plurality of images by using zoom magnification information about each of the first image and the third image.

21. The digital photographing apparatus of claim 16, wherein the graphic indicator is displayed in a region corresponding to the first direction from a center of the first image displayed, and is activated by a manipulation unit corresponding to the first direction or by an inclination sensor corresponding to the first direction.

22. A non-transitory computer-readable recording medium having recorded thereon a computer program that, when executed by a processor, causes the processor to perform a method of displaying an image captured by a digital photographing apparatus, wherein the method comprises:

displaying a first image from among a plurality of images stored in the digital photographing apparatus;

displaying a graphic indicator denoting one or more user selectable directions;

receiving user input of a selected first direction;

retrieving a second image from among the plurality of stored images, wherein the second image is retrieved based on the user selected first direction so that the second image is related to the first image as having been captured within a predetermined distance in the first direction from where the first image was captured; and displaying the second image in response to receiving the user input, wherein the retrieving of the second image from the plurality of images comprises selecting the second image from the plurality of images that are arranged in the first direction according to a difference between a position at which each of the plurality of images was captured and a position at which the first image was captured.

* * * * *